United States Patent
Koujalagi et al.

(10) Patent No.: US 10,248,336 B1
(45) Date of Patent: Apr. 2, 2019

(54) EFFICIENT DELETION OF SHARED SNAPSHOTS

(71) Applicant: Tintri by DDN, Inc., Mountain View, CA (US)

(72) Inventors: Dattatraya Koujalagi, Sunnyvale, CA (US); Shobhit Dayal, San Francisco, CA (US); Karthik Ravichandra, Newark, CA (US)

(73) Assignee: Tintri by DDN, Inc., Chatsworth, CA (US)

( * ) Notice: Subject to any disclaimer, the term of this patent is extended or adjusted under 35 U.S.C. 154(b) by 0 days.

(21) Appl. No.: 15/282,120

(22) Filed: Sep. 30, 2016

(51) Int. Cl.
| | | |
|---|---|---|
| *G06F 12/00* | (2006.01) | |
| *G06F 3/06* | (2006.01) | |
| *H04L 29/08* | (2006.01) | |
| *G06F 17/30* | (2006.01) | |
| *G06F 11/14* | (2006.01) | |
| *G06F 11/20* | (2006.01) | |

(52) U.S. Cl.
CPC ............ *G06F 3/0619* (2013.01); *G06F 3/065* (2013.01); *G06F 3/067* (2013.01); *G06F 3/0652* (2013.01); *G06F 11/1451* (2013.01); *G06F 11/2074* (2013.01); *G06F 17/30156* (2013.01); *G06F 17/30312* (2013.01); *H04L 67/2842* (2013.01)

(58) Field of Classification Search
CPC ........... G06F 17/30156; G06F 11/1451; G06F 11/2064; G06F 11/2074; G06F 17/30312; H04L 67/1097; H04L 67/2842
USPC .......................................... 711/162; 707/609
See application file for complete search history.

(56) References Cited

U.S. PATENT DOCUMENTS

| | | | | |
|---|---|---|---|---|
| 6,269,431 | B1 * | 7/2001 | Dunham | G06F 11/1469 |
| | | | | 707/999.202 |
| 6,353,878 | B1 * | 3/2002 | Dunham | G06F 11/1456 |
| | | | | 707/999.009 |
| 6,366,987 | B1 * | 4/2002 | Tzelnic | G06F 11/1451 |
| | | | | 711/112 |
| 8,738,575 | B2 * | 5/2014 | Anglin | G06F 17/30221 |
| | | | | 707/640 |
| 9,229,818 | B2 * | 1/2016 | Doshi | G06F 11/1448 |
| 2017/0316030 | A1 * | 11/2017 | Shetty | G06F 9/45558 |

* cited by examiner

*Primary Examiner* — Mardochee Chery
(74) *Attorney, Agent, or Firm* — Van Pelt, Yi & James LLP

(57) ABSTRACT

Efficient deletion of a shared snapshot and other workflows are described herein, including: determining to delete a shared snapshot associated with a first container, wherein the shared snapshot shares with a second container at least a subset of data values that are stored by the shared snapshot, the determination is based at least in part on the shared snapshot sharing data values with not more than a prescribed number of containers other than the second container and an occurrence of a deletion triggering event; and causing zero or more data values that are stored by the shared snapshot and shared with the second container to be associated with the second container prior to deleting the shared snapshot.

23 Claims, 17 Drawing Sheets

Source Metadata

Clone Metadata

1400

| Shared Snapshot | Clone Container | Snapshot of the Clone Container |
|---|---|---|
| SS0 | File 1 | SS1 |
| SS1 | File 2 | SS2 |
| SS2 | File 3 | SS3 |
| SS3 | File 4 | SS4 |
| SS3 | File 5 | SS5 |
| SS3 | File 6 | (none) |

FIG. 14

EFFICIENT DELETION OF SHARED SNAPSHOTS

BACKGROUND OF THE INVENTION

A clone of a virtual machine (VM) can be generated from a snapshot such that the clone would be able to access at least some of the data that is stored by the snapshot. Over time, the snapshot may become less useful or not used at all by the clone VMs that depend from it. However, typically, a snapshot cannot be deleted until zero clones depend from the snapshot and also zero other snapshots refer to the snapshot. This restriction can create space inefficiency in the system due to expired shared snapshots (e.g., snapshots that have been created for more than a predetermined threshold length of time) or otherwise unused shared snapshots locking down redundant storage space.

BRIEF DESCRIPTION OF THE DRAWINGS

Various embodiments of the invention are disclosed in the following detailed description and the accompanying drawings.

FIG. 14 is an example of a dependency relationship data structure.

DETAILED DESCRIPTION

Figure 1:
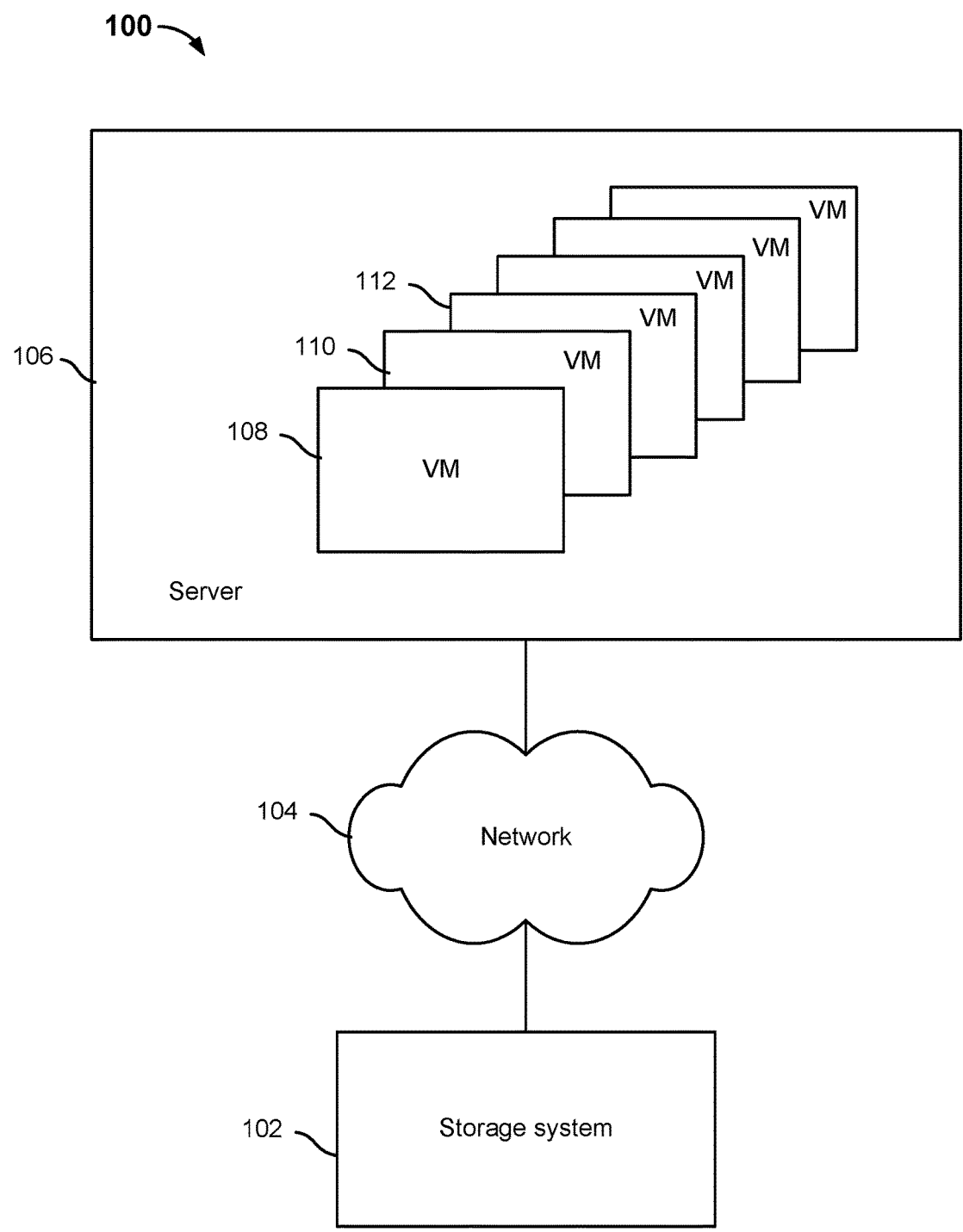
FIG. 1 is a diagram showing an embodiment of a storage system for the storage of VMs using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A "snapshot" comprises a point-in-time state of a container and in various embodiments, a subsequently generated snapshot includes mappings to data that was modified since the previous snapshot was created. A container may include a virtual machine (also sometimes referred to as a "VM"), a virtual disk (also sometimes referred to as a "vdisk"), or a file, for example. In various embodiments, a set of metadata associated with a container (e.g., a VM, a vdisk, or a file) comprises one or more snapshots. In various embodiments, a snapshot associated with a point-in-time state of a container is physically represented/stored as a data structure (e.g., an index) at a storage system. As used herein, a "snapshot" is sometimes used to refer to a state of a container at a particular point-in-time and/or the physical representation (e.g., an index) that represents that state of the container at that particular point-in-time at a particular storage system. A "user" performs read operations on a snapshot using "logical offsets," which are mapped to "physical offsets" using the indices associated with the snapshots comprising the container. The physical offsets can then be used to read and write data from the underlying physical storage devices. Read operations look up the logical offset in one or more indices to find the corresponding physical offset, while write operations create new entries or update existing entries in indices. Because each snapshot index includes mappings to data modified since the immediately previously generated (i.e., older) snapshot index, each snapshot index (other than the oldest snapshot index) associated with the container may depend on (e.g., point to, link to, and/or otherwise reference) at least a next older snapshot index. As such, snapshots associated with different points-in-time states of the container can be represented as a sequence of snapshot indices at a storage system.

In various embodiments, a "clone" refers to a copy of an existing container (the existing container is sometimes referred to as a "source container"). In various embodiments, a clone is a separate container from the source container. In various embodiments, a clone is generated from a snapshot of the source container. In various embodiments, the snapshot of the source container from which a clone is created is referred to as a "shared snapshot." To generate the clone, a new set of metadata is created and data associating the clone's new set of metadata to the source container's set of metadata is stored such that at least some of the snapshot indices associated with the source container are to be shared with the new set of metadata associated with the clone and at least some of the data associated with source data is shared with the clone.

Embodiments of performing an efficient deletion of a shared snapshot are described herein. A shared snapshot associated with a first container is determined to be deleted, where the shared snapshot shares with a second container at least a subset of data values that are stored by the shared snapshot. In some embodiments, the second container comprises a clone that was generated based on the shared snapshot of the first container. The determination to delete the snapshot is determined based at least in part on the shared snapshot sharing data values with no more than a prescribed number of containers other than the second container and also an occurrence of a deletion triggering event. For example, the prescribed number of containers other than the second container is zero (i.e., the second container is the only clone that depends from the shared snapshot). For example, the occurrence of a deletion triggering event is that at least a predetermined threshold amount of new data values have been written to the second container. Zero or more data values that are stored by the shared snapshot and shared with the second container are caused to be associated with the second container prior to deleting the shared snapshot.

FIG. 1 is a diagram showing an embodiment of a storage system for the storage of VMs using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using VM storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of VM storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other VM storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
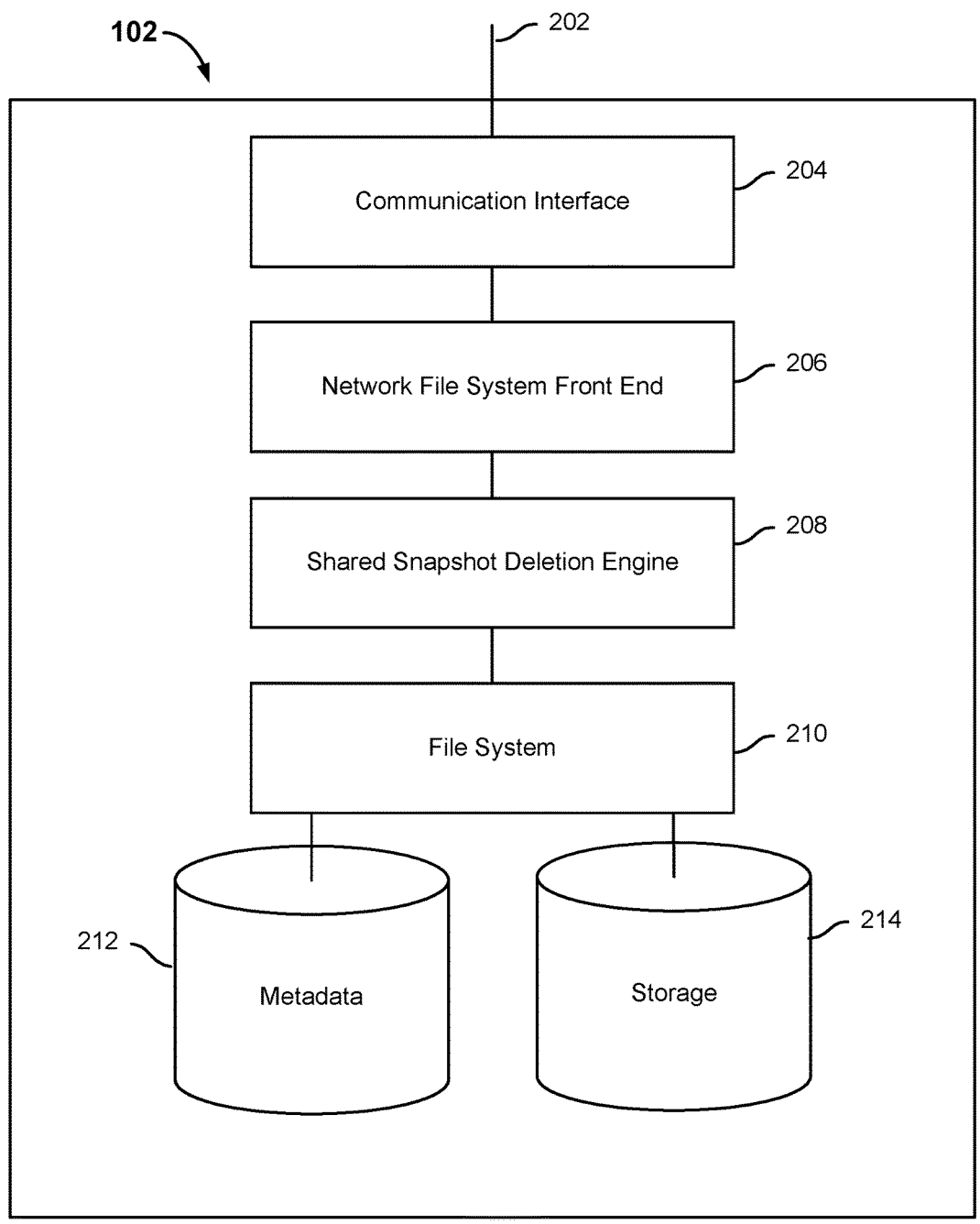
FIG. 2 is a block diagram illustrating an embodiment of a storage system including data and metadata.

FIG. 2 is a block diagram illustrating an embodiment of a storage system including data and metadata. In some embodiments, storage system 102 of FIG. 1 may be implemented using the example storage system of FIG. 2. In the example shown, the storage system includes network connection 202 and communication interface 204, such as a network interface card or other interface, which enable the storage system to be connected to and communicate via a network such as network 104 of FIG. 1. Storage system 102 further includes network file system front end 206 configured to handle requests from VMs running on systems such as server 106 of FIG. 1. In various embodiments, network file system front end 206 is configured to associate requests as received and processed with a corresponding VM and/or vdisk with which the request is associated, for example, using meta-information stored on storage system 102 or elsewhere. Storage system 102 includes file system 210 configured and optimized to store VM data. In the example shown, metadata 212 comprises a database (or multiple databases) that is configured to store sets of metadata associated with various sets of data. For example, a set of metadata may be associated with a VM, a vdisk, or a file. Storage 214 may comprise at least one tier of storage. In some embodiments, storage 214 may comprise at least two tiers of storage, where the first tier of storage comprises a flash or other solid state disk (SSD) and the second tier of storage comprises a hard disk drive (HDD) or other disk storage. In various embodiments, a set of metadata stored at metadata 212 includes at least one index that includes mappings to locations in storage 214 at which a set of data (e.g., a VM, vdisk, or file) associated with the set of metadata is stored. In some embodiments, a set of metadata stored at metadata 212 includes at least an index that is a snapshot associated with a container stored in storage 214. In some embodiments, a set of metadata associated with a container (e.g., a VM, vdisk, or file) comprises a set of active (e.g., read and write permissible) indices, such as a "live index" and a "current snapshot index" and/or a set of read-only indices, such as snapshots. A "live index," a "current snapshot index," and snapshot indices will be described in further detail below.

Storage system 102 further includes shared snapshot deletion engine 208. Shared snapshot deletion engine 208 is configured to first identify shared snapshots that are to be deleted. In various embodiments, a shared snapshot is to be deleted if the shared snapshot, which is associated with a container (e.g., a VM, a vdisk, or file), has no more than a configured number of clone containers referencing it and a deletion triggering event has occurred. In various embodiments, the configured number of clones is configured by a user. In various embodiments, the configured number of clones is one. In some embodiments, the configured number of clones is more than one. Examples of the deletion triggering event comprise a predetermined expiration time associated with the shared snapshot lapsing, a predetermined number of data values having been written to the clone container(s), a predetermined number of data values shared by the shared snapshot with the clone container having been overwritten by new data values at the clone container(s), and a user initiated operation to delete the shared snapshot. In some embodiments, in order to be eligible to be deleted, a shared snapshot is not associated with a container that has a live index. In some embodiments, in order to be eligible to be deleted, a shared snapshot has no younger snapshots and no older snapshots to which it is associated (e.g., references).

After a shared snapshot that is to be deleted is identified, shared snapshot deletion engine 208 is configured to merge at least some of the data values that are stored by the shared snapshot and that are still needed (e.g., not overwritten) by the clone container(s) into the clone container(s) prior to deleting the shared snapshot. In various embodiments, shared snapshot deletion engine 208 is configured to first determine which data values, if any, are stored by a shared snapshot and are not yet overwritten at a clone container. Then, shared snapshot deletion engine 208 is configured to merge these determined data values (or at least references to these data values) into that clone container. In the event that the shared snapshot to be deleted has more than one dependent clone, then each clone container is individually analyzed for data values that were shared by the shared snapshot and that have not yet been overwritten at that particular clone. The identified data values for each clone are then merged from the shared snapshot to that specific clone. In some embodiments, shared snapshot deletion engine 208 is configured to copy these determined respective data values (or at least references to these data values), if any, into the live index of each clone container and the oldest snapshot index of each clone container (and if the clone container does not have any snapshots, then the data values and/or the references thereof are stored in the current snapshot index associated with the clone container). After the respective determined data values (or at least references to these data values) have been merged into each clone container, the shared snapshot can be deleted or at least marked for deletion.

In various embodiments, the deletion of a shared snapshot does not necessarily cause the clone container to be become independent (i.e., no longer dependent on any shared snapshots). For example, a first shared snapshot from which a clone container depended could be deleted but if the shared snapshot had itself depended from (e.g., was cloned from) a second shared snapshot, then the clone container would directly depend from the second shared snapshot.

For purposes of illustration, deleting a shared snapshot that has only one dependent clone is described in several examples herein. However, in practice, the same techniques can be applied to deleting a shared snapshot with more than one dependent clone.

Figure 3:
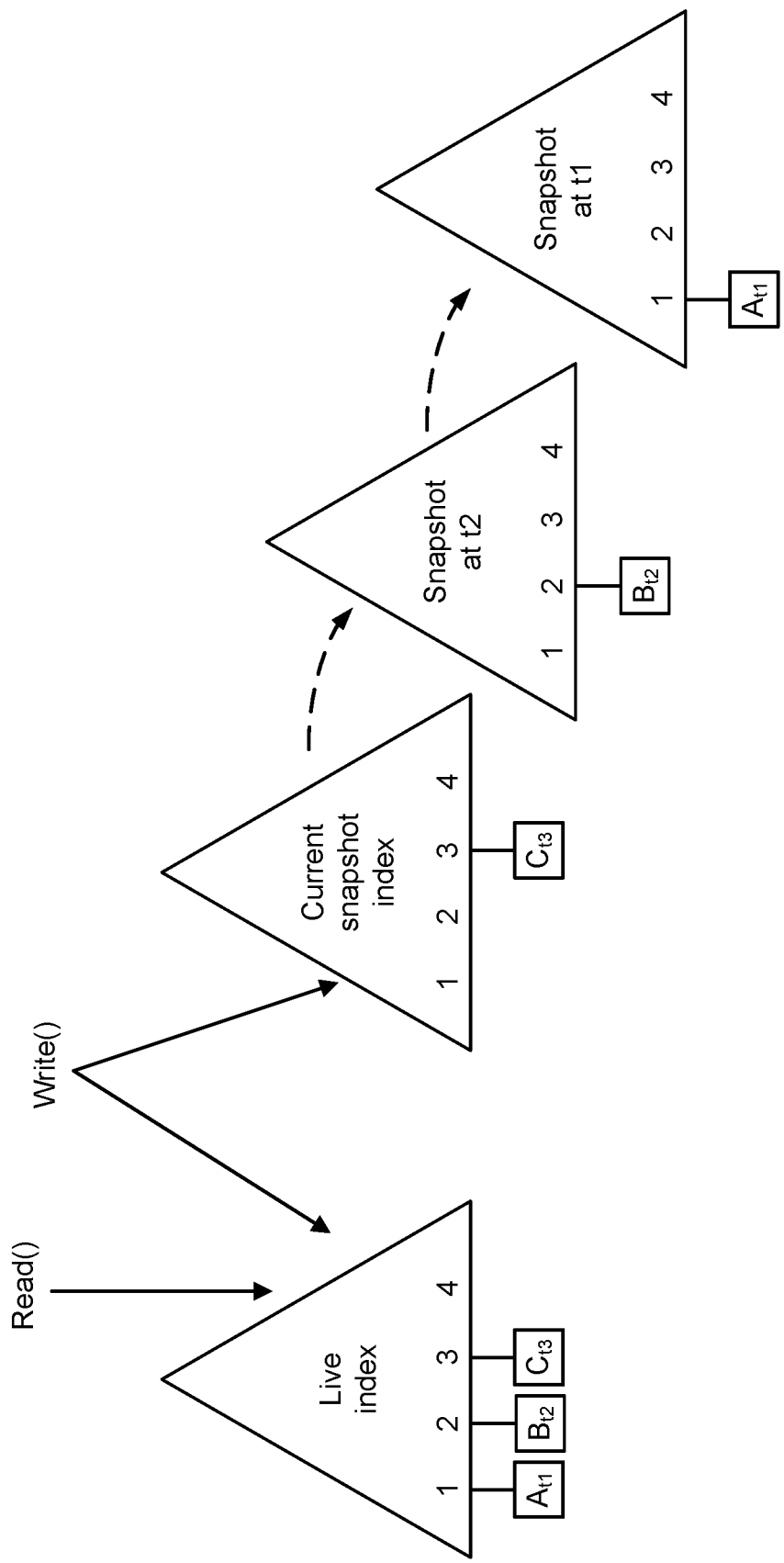
FIG. 3 is a diagram showing an example of a set of metadata associated with a container.

FIG. 3 is a diagram showing an example of a set of metadata associated with a container. A set of metadata may be associated with a container (e.g., a VM, a vdisk, or a file). In the example of FIG. 3, assume that the set of metadata is associated with a file. In the example, the set of metadata includes a current snapshot index, a snapshot at time t2, and a snapshot at time t1. The current snapshot index depends on (e.g., is linked to) the snapshot at time t2 and the snapshot at time t2 depends on (e.g., is linked to) the snapshot at time t1. In the example, data associated with the file may be stored at logical offsets 1, 2, 3, and 4.

Metadata may be thought of as the mapping used to translate a logical offset (e.g., a logical location) to a physical offset (e.g., a physical location) of underlying storage for data that a user may have written. In various embodiments, the metadata may be organized as an efficient index data structure such as a hash table or a B-tree. For example, the relationship between a logical offset of a data, the index, and the physical offset of the data may be described as follows: logical-offset→INDEX→physical-offset. In some embodiments, an index stores at each logical offset to which data has been written, a reference data (e.g., a pointer) that is associated with a metadata value that identifies a physical offset or other identifier location on a physical storage device at which the data value written to that logical offset is stored. By storing references (e.g., pointers) at the logical offsets of an index, when the data values that are associated with the index are to be merged into another index, only the references to the locations in physical storage of the relevant data values need to be copied into the other index rather than the physical copies of data values themselves. As will be described in further detail below, in various embodiments, prior to deleting a shared snapshot that is determined to be deleted, zero or more references to data values that are stored in the index of the shared snapshot index are merged into each clone container.

In various embodiments, each set of metadata includes at least one active index: the "current snapshot index." The current snapshot index is active in the sense that it can be modified. In some embodiments, the current snapshot index stores all offsets in the file that have been written since the previous snapshot was created. A snapshot is typically a read-only file, but the current snapshot index is modifiable until the next prescribed snapshot creation event occurs. For example, a prescribed snapshot creation event may be configured by a user and may comprise the elapse of an interval of time, the detection of a particular event, or a receipt of a user selection to create a new snapshot. Once the next prescribed snapshot creation event is reached, the state of the current snapshot index is preserved to create a new snapshot and a new empty current snapshot index is created. In some embodiments, write operations to the container result in the update of the current snapshot index. In some embodiments, read operations of the container result in the search of a current snapshot index and subsequently, a search through the sequence of snapshots if the desired data is not found in the current snapshot index. In various embodiments, each index is searched in a prescribed manner.

In some embodiments, a snapshot of a file is the point-in-time state of the file at the time the snapshot was created. A snapshot of a VM is the collection of file-level snapshots of files that comprise the VM. In some embodiments, at a storage system, a snapshot is represented as an index that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

When a snapshot is created, the current snapshot index becomes the index of that snapshot, and a new empty current snapshot index is created in preparation for the next snapshot. Each snapshot is linked to (or otherwise physically dependent on) the next younger and next older snapshot. In some embodiments, the links that go backward in time (i.e., the links to the next older snapshots) are traversed during snapshot and clone read operations.

Returning to the example of FIG. 3, the current snapshot index is linked to (e.g., points to) the snapshot at time t2 and the snapshot at time t2 is linked to the snapshot at time t1. As shown in the example of FIG. 3, each of the snapshot at time t2 and the snapshot at time t1 is represented by a corresponding index. The snapshot at time t1 can be referred to as being "older" than the snapshot at time t2 and the snapshot at time t2 can be referred to as being "younger" than the snapshot at time t1 because time t1 is earlier than time t2. Because the snapshot at time t2 is linked to the snapshot at time t1, the snapshot at time t2 and the snapshot at time t1 can be referred to as a chain or sequence of snapshots associated with the file. In some embodiments, each snapshot index of the set of metadata associated with the file is associated with a stored "file global ID" that identifies that the sequence of snapshots belongs to the file. Read operations to the current state of the file can be serviced from the current snapshot index and/or the snapshot at time t2 and the snapshot at time t1, while write operations to the file update the current snapshot index. In the example of FIG. 3, data value A is written before time t1 at logical offset 1 and then the snapshot at time t1 is created. Data value B is written before time t2 and after time t1 at logical offset 2 and then the snapshot at time t2 is created. Data value C is written after time t2, at time t3 at offset 3 and tracked in the current snapshot index. For example, if a new data value D (not shown) is to overwrite the data currently at logical offset 3, data value C, at time t4, then logical offset 3 of the current snapshot index would be updated to map to data value D.

In various embodiments, a read operation on a specified snapshot for a logical block offset may proceed in the following manner: First, a lookup of the specified snapshot index is performed for the logical block offset of the read operation. If a mapping exists, then data is read from the physical device (underlying storage) at the corresponding physical address and returned. Otherwise, if the mapping does not exist within the specified snapshot index, the link to the next older snapshot is traversed and a search of this older snapshot's index is performed. This process continues until a mapping for the logical block offset is found in a snapshot index or the last snapshot in the chain has been examined. For example, assume that a read operation to the container requests current data associated with logical offset 1. First, the current snapshot index of the container is searched for a mapping to data associated with logical offset 1. The mapping is not found in the current snapshot index, so the link (e.g., the stored associating data) from the current snapshot index to the snapshot at time t2 is traversed and a search of the snapshot at time t2 is performed. The mapping is not found in the snapshot at time t2, so the link from the snapshot at time t2 to the next older snapshot, the snapshot at time t1, is traversed and a search of the snapshot at time t1 is performed. The mapping associated with logical offset 1 is found in the snapshot at time t1, the search ends, and the snapshot at time t1 is used to service the request.

The use of the live index greatly enhances the efficiency of reading the current state of the file. To illustrate this, first assume that the live index of FIG. 3 is not used. In a first example of performing a read operation without using the live index of FIG. 3, we attempt to perform a read operation to access the current data associated with logical offset 1. First, a lookup of a mapping to the data associated with logical offset 1 is performed in the current snapshot index. However, such a mapping is not found in the current snapshot index and so the link to the next older snapshot, the snapshot at time t2, is traversed and a search for the mapping to data associated with logical offset 1 is performed. Again, such a mapping is not found in the snapshot at time t2 and so the link to the next older snapshot, the snapshot at time t1, which is also the last snapshot in the chain, is traversed and a search for the mapping to data associated with logical offset 1 is performed. The data associated with logical offset 1, data value A, is found in snapshot at time t1 and data value A is accessed to complete the read operation. As described in this example, without using the live index, the data associated with logical offset 1 was found after the expensive traversals from the current snapshot index, to the snapshot at time t2, and then to the snapshot at time t1. However, if the live index of FIG. 3 is used, then a search for the data associated with logical offset 1 may be first performed in the live index. Using the live index, data value A associated with logical offset 1 is quickly located without needing to perform any traversals between indices.

In a second example of performing a read operation without using the live index of FIG. 3, we attempt to perform a read operation to access the current data associated with logical offset 4. First, a lookup of a mapping to the data associated with logical offset 4 is performed in the current snapshot index. However, such a mapping is not found in the current snapshot index and so the link to the next older snapshot, the snapshot at time t2, is traversed and a search for the mapping to data associated with logical offset 4 is performed. Again, such a mapping is not found in the snapshot at time t2 and so the link to the next older snapshot, the snapshot at time t1, which is also the last snapshot in the chain, is traversed and a search for the mapping to data associated with logical offset 4 is performed. Yet again, such a mapping is not found in the snapshot at time t1 and so a message that indicates that no data is stored for logical offset 4 is returned for the read operation. As described in this example, without using the live index, the data associated with logical offset 4 was not located even after the expensive traversals from the current snapshot index all the way to the last snapshot in the chain, the snapshot at time t1. However, if the live index of FIG. 3 is used, then a search for the data associated with logical offset 4 may be first performed in the live index. Using the live index, it is quickly apparent that no data has been stored for logical offset 4 and therefore an appropriate message can be returned for the read operation without needing to perform any costly traversals between indices. An example in which a read operation may attempt to read data from a logical offset for which no data has been stored is in a distributed system in which a first node may attempt to read data at a logical offset associated with a second node and unbeknownst to the first node, the second node never stored any data at that logical offset.

Figure 4:
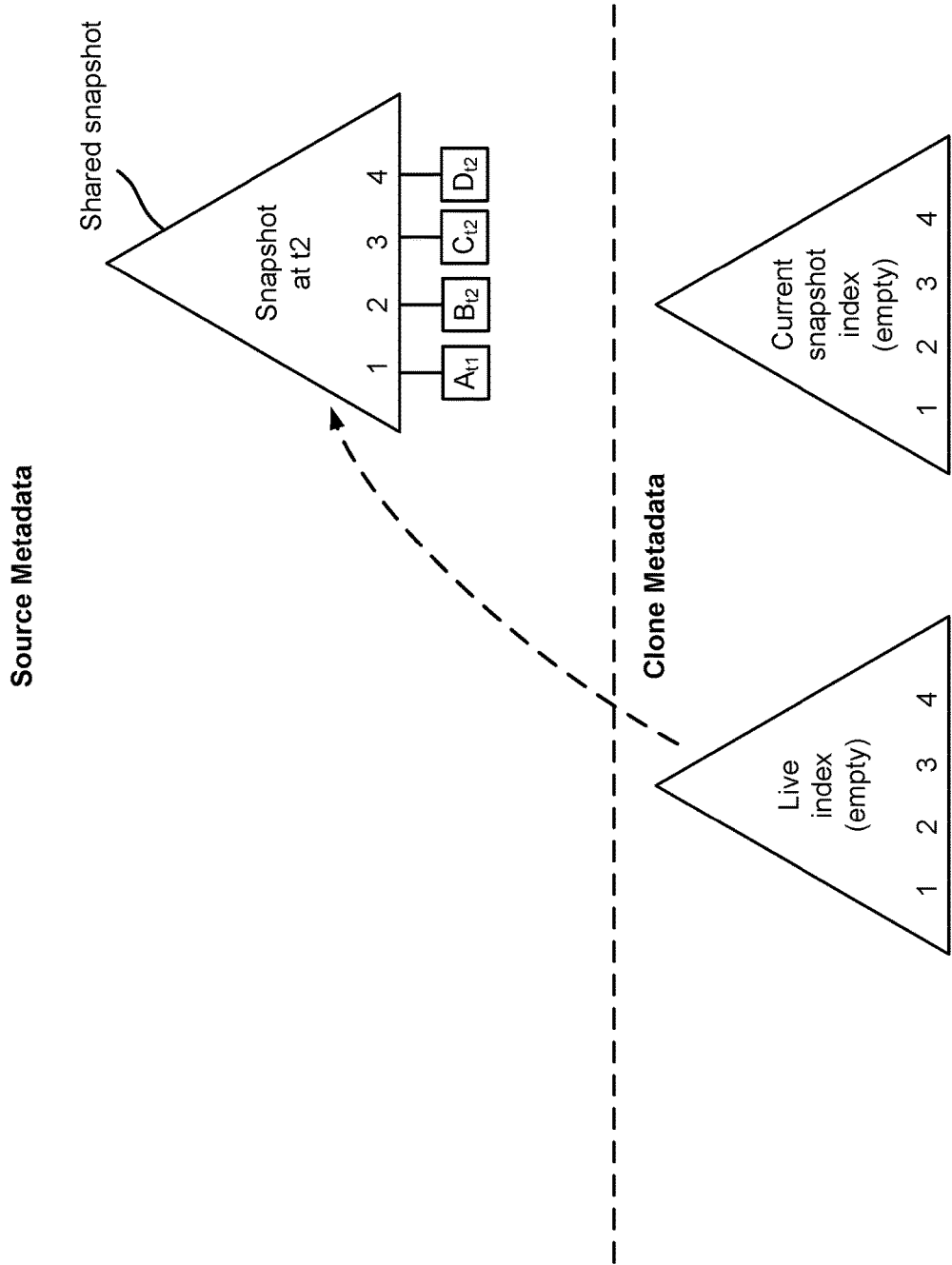
FIG. 4 is a diagram showing an example of a set of metadata associated with a source container and a set of metadata associated with a clone, prior to new data values being written to the clone.

FIG. 4 is a diagram showing an example of a set of metadata associated with a source container and a set of metadata associated with a clone, prior to new data values being written to the clone. In some embodiments, a clone may be created from an existing snapshot of a container. As previously described, in order to reduce metadata and data space consumption, snapshots are represented in a compact format that only stores the changes that have been made to the associated container since the previous snapshot was created. The set of metadata associated with the source container (the source metadata) includes only a snapshot at time t2. As shown in the example of FIG. 4, the snapshot at time t2 is represented by a corresponding index. In the example, the clone is created from the snapshot at time t2 of the source metadata. Therefore, the snapshot at time t2 is now also referred to as a shared snapshot because it is now shared between the source container and its clone. In the example of FIG. 4, data values A, B, C, and D that are written to respective logical offsets 1, 2, 3, and 4 of the snapshot at time t2 are shared with the clone. While not shown in the example, one or more other clones besides the one shown may be created from the snapshot at time t2 of the source metadata. In some embodiments, each snapshot has an associated reference count that tracks the total number of clones that have been created from the snapshot. After a clone creation operation has completed, the reference count of the shared snapshot is incremented by the number of new clones that were created from the snapshot. When a clone is deleted, the reference count associated with the shared snapshot from which the clone was created is decremented by one. In some embodiments, the reference count of a shared snapshot is considered when it is determined whether the shared snapshot should be deleted. In some instances, a snapshot may be deleted if it has a reference of zero. As described herein, in various embodiments, a shared snapshot may be deleted if it has a predetermined non-zero number of clones (e.g., one or more clones).

Also, as will be described further below, a data structure (e.g., a dependency relationship table) may be created to store information identifying the clone container(s) that have been generated from each snapshot. As such, the data structure may be traversed to determine the dependencies between a shared snapshot and its clone container(s), the dependencies between those clone container(s) and any clone container(s) that were generated from snapshot thereof, if any, and so forth, such that a hierarchy of shared snapshots and their respective clone container(s) may be determined.

In various embodiments, creating clones (e.g., from snapshots of containers) does not require copying metadata and/or data. Instead, a new empty live index and a new empty current snapshot index are created for each clone. Furthermore, information associating the live index of each clone with the shared snapshot of the source data is stored. The information associating the live index of the clone with the shared snapshot may be stored with the clone metadata, the source metadata, or elsewhere. For example, the associating data is a pointer or another type of reference that the live index of each clone can use to point to the index of the shared snapshot from which the clone was created. This link to the shared snapshot is traversed during reads of the clone as will be described in further detail below. As shown in the example of FIG. 4, an empty live index and an empty current snapshot index are created for the new clone. The live index of the clone points back to the shared snapshot of the source data, the snapshot at time t2. The live index and the current snapshot index of the clone will remain empty until new data is written to the clone. Writes to the clone may occur with respect to logical offsets for which associated data values were shared by the shared snapshot and thereby "overwrites" such shared data.

To perform a read of a snapshot of the clone, the index of that snapshot is accessed first. If the desired data is not in that snapshot index of the clone, then the clone's snapshots are traversed backwards in time. If one of the clone's snapshot indices includes a mapping for the logical block offset of the requested data, then data is read from the corresponding physical address and returned. However, if the desired data is not in the live index (or alternatively, any of the clone's snapshot indices), then the source's snapshots are traversed backwards in time starting from the shared snapshot on which the clone was based (i.e., if the mapping to the requested data is not found in the shared snapshot of the source metadata, then the link to the next older snapshot, if available, is traversed and searched, and so forth). For example, assume that a read operation to the clone requests data associated with offset 1. First, the mapping is not found in the live index of the clone, so the link (e.g., the stored associating data) from the clone's live index to the shared snapshot is traversed and a search of the shared snapshot, the snapshot at time t2, is performed. The mapping associated with offset 1 is found in the snapshot at time t2 of the source container, the search ends, and the snapshot at time t2 is used to service the request. Therefore, the mapping found in the snapshot at time t2, the shared snapshot, of the source container is used to service the read operation to the clone. As shown in the example, metadata (e.g., snapshots) may be shared between a source container and its clone and therefore, in some instances, read operations to the clone may be serviced by metadata associated with the source container.

Various scenarios result in the creation of several shared snapshots (e.g., by creating clones from snapshots). In some instances, some shared snapshots with one or more dependent clones each are no longer space efficient to maintain but cannot be deleted by the conventional requirement of maintaining a shared snapshot if they have at least one dependent clone. Therefore, shared snapshots in such scenarios create storage space inefficiencies. Below are two such example scenarios:

1) Failover and Failback Events

A container, VM A, for example, runs on a primary storage system. Periodically, a new snapshot of VM A is generated at the primary storage system. The latest snapshot of VM A, for example, is periodically sent from the primary storage system to a secondary storage system. In the event of a failure or other cause for shutting down the primary storage system, a failover procedure causes a clone at the secondary storage system to be generated based on the latest snapshot of VM A so that the data of VM A can be accessed at the secondary storage system via its clone. New snapshots of the clone of VM A are periodically generated at the secondary storage system and at least some of which are sent back to the primary storage system, after the primary storage system becomes available again. At the next failback event (e.g., the secondary storage system fails or shuts down for some other reason), VM A is restored at the primary storage system by generating a clone based on the latest snapshot (of a previous clone) associated with VM A that is stored at the primary storage system, and so forth. In the case where more than two storage systems are to perform failover events, the new snapshots of a latest clone of VM A would be sent to the next successive storage system.

As such, each failover event and each failback event for VM A would create a shared snapshot by virtue of generating a clone of VM A based on the latest snapshot associated with VM A. However, over time, shared snapshots with dependent clones that were created for earlier failover and failback events are no longer needed to access the data of VM A and could unnecessarily occupy storage space. Embodiments of efficiently deleting shared snapshots as described herein may be used to delete shared snapshots created in failover and failback events.

2) Updating a Shared Snapshot for which One or More Clones Already Depend

Some applications permit a shared snapshot, which had been used to generate one or more clones, to be updated, such that the clones would also be affected by the update. For example, the original shared snapshot comprises a virtual desktop and each of its clones may store personalized data that is associated with a corresponding user of the virtual desktop. In this example, the update to the shared snapshot associated with the virtual desktop comprises a software update to fix bugs. However, after the original shared snapshot is updated, some applications generate a snapshot from each clone of the original shared snapshot. Then, the applications generate a new clone from the snapshot of each corresponding clone of the original shared snapshot such that the users of the clones may access the clone's data via the new clones that were generated from the respective snapshots of the previously existing clones.

Therefore, snapshots of clones of the original shared snapshot themselves become shared snapshots that are dependent on the original shared snapshot and can be thought of as intermediate shared snapshots. Embodiments of efficiently deleting shared snapshots as described herein can be used to delete such intermediate shared snapshots. For example, the intermediate shared snapshots can either be automatically identified as eligible for deletion or can be selected by a user to delete.

Figure 5:
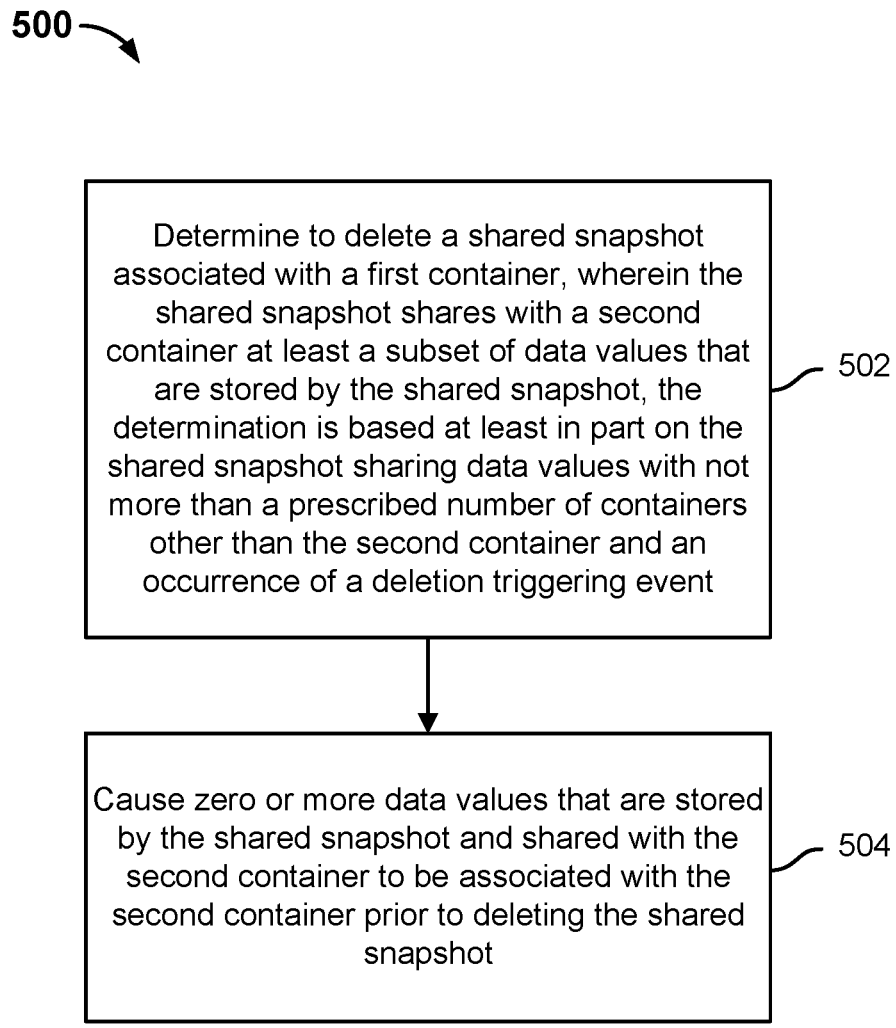
FIG. 5 is a flow diagram showing an embodiment of a process for performing efficient deletion of a shared snapshot.

FIG. 5 is a flow diagram showing an embodiment of a process for performing efficient deletion of a shared snapshot. In some embodiments, process 500 is implemented at storage system 102 of FIG. 1.

At 502, a shared snapshot associated with a first container is determined to be deleted, wherein the shared snapshot shares with a second container at least a subset of data values that are stored by the shared snapshot, the determination is based at least in part on the shared snapshot sharing data values with not more than a prescribed number of containers other than the second container and an occurrence of a deletion triggering event.

The second container is a clone of the shared snapshot associated with the first container. The first and the second containers are the same type of containers (e.g., both containers are VMs, both containers are vdisks, or both containers are files). In various embodiments, the prescribed number of containers other than the second container is zero (i.e., the second container is the only clone that depends from the shared snapshot of the first container). In some embodiments, the prescribed number of containers other than the second container is one or more than one (i.e., including the second container, there are multiple clones that depend from the shared snapshot of the first container). In various embodiments, the shared snapshot becomes eligible for deletion because the second container and the prescribed number of other containers are the only clone(s) that depend from the shared snapshot of the first container and at least one deletion triggering event has occurred.

A first example of a deletion triggering event is an elapse of a predetermined expiration time since a creation of a shared snapshot. For example, the expiration time may be measured from the time at which the snapshot is created or the time at which a first clone is generated from the snapshot, thereby making it a shared snapshot.

Figure 7:
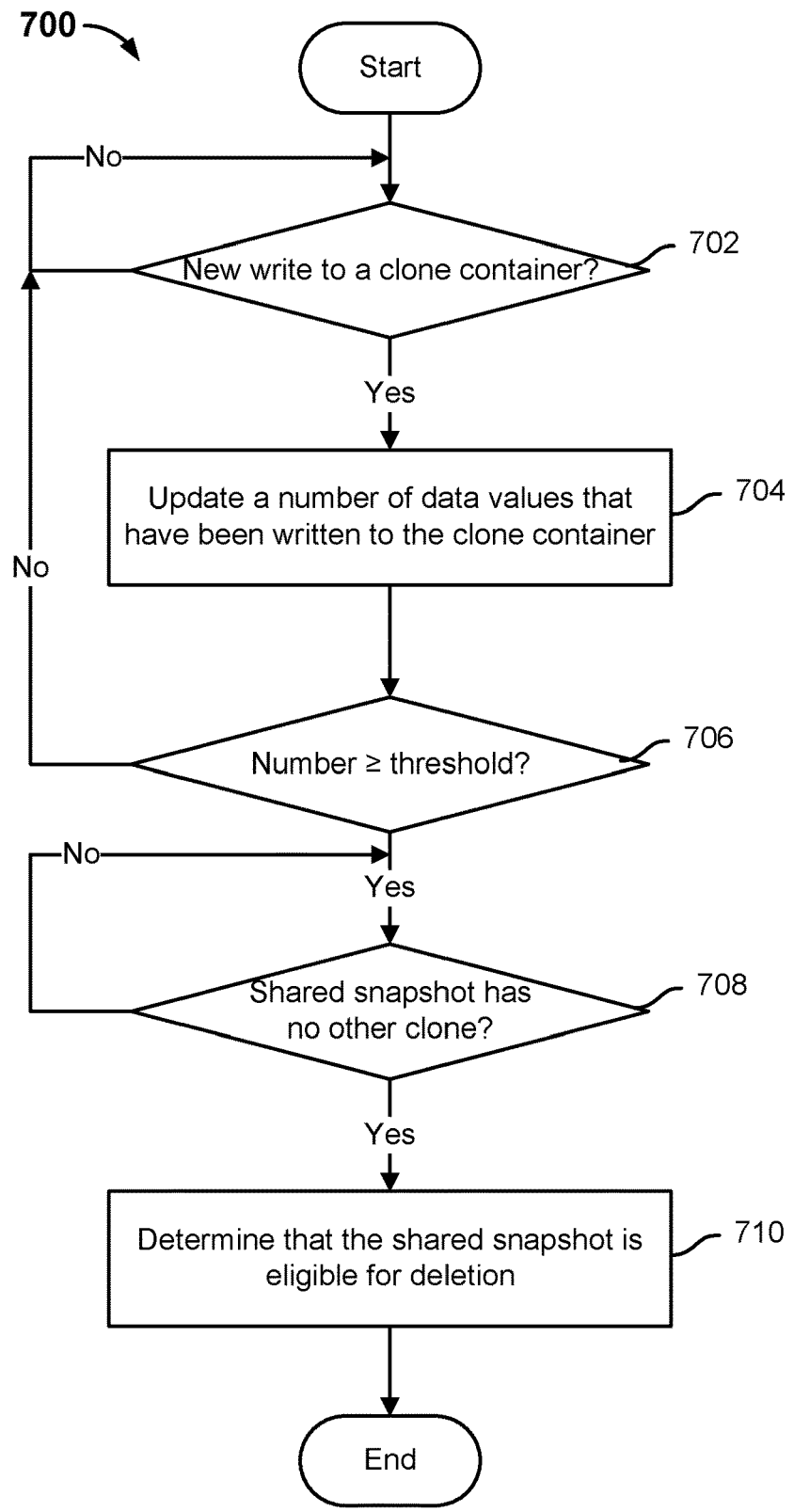
FIG. 7 is a flow diagram showing an example of a determining an occurrence of a shared snapshot deletion event based on a number of data values that have been written to a clone of a shared snapshot.

A second example of a deletion triggering event is that at least a predetermined number of data values have been written to each clone (e.g., the second container) of the shared snapshot. As more data values are written to a particular clone, it is assumed that it is more likely that data values that were shared between the shared snapshot and the clone are being overwritten by data values at the clone(s). As such, a counter can keep track of how many data values have been written to each clone, until a predetermined number of such data values has been written, in which it is assumed that a sufficient number of data values that have been shared by the shared snapshot have been overwritten and that the shared snapshot therefore no longer provides an efficient usage of storage space. FIG. 7, below, describes an example process of determining when this type of deletion triggering event has occurred.

Figure 8:
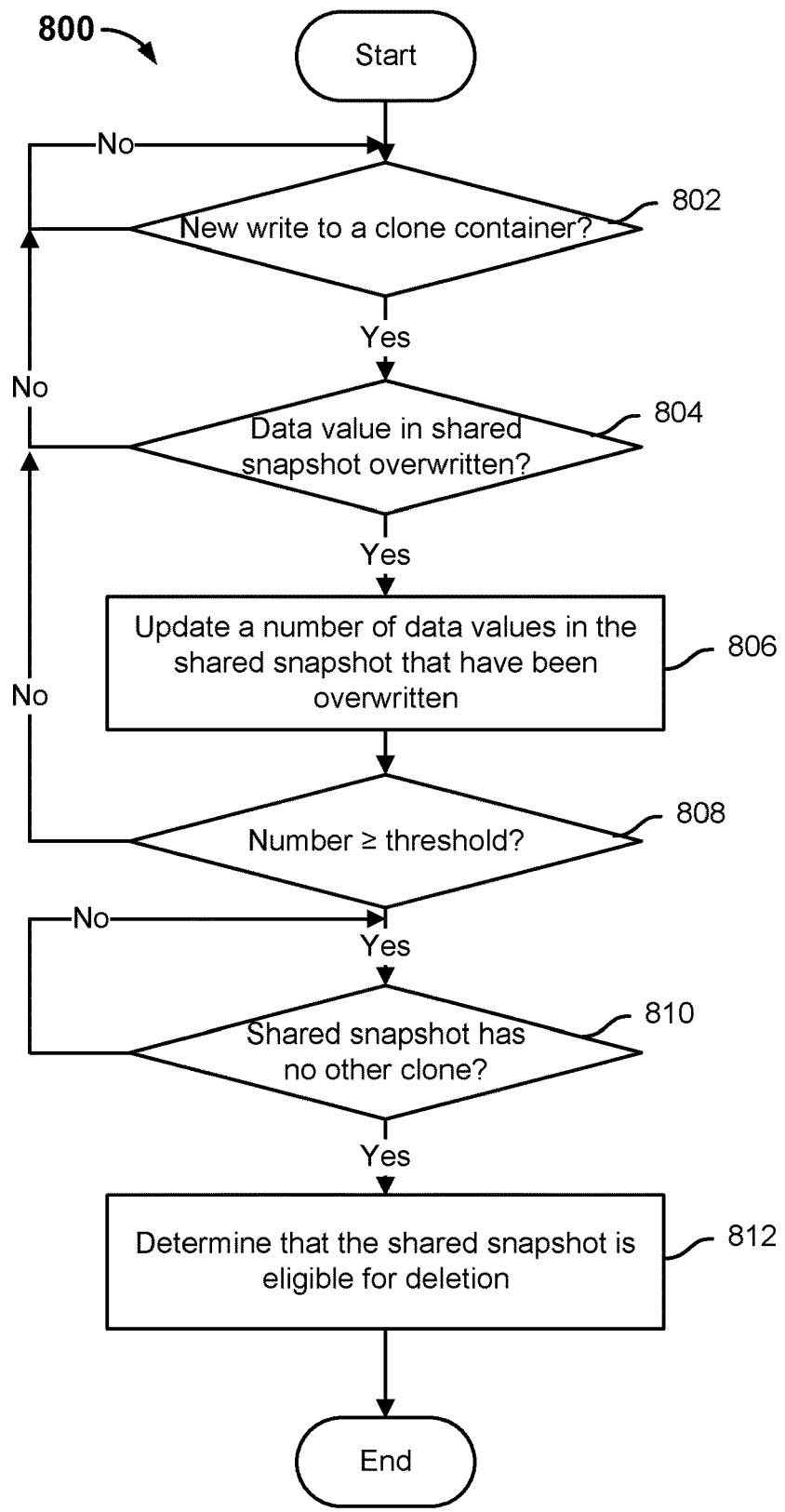
FIG. 8 is a flow diagram showing an example of a determining an occurrence of a shared snapshot deletion event based on a number of data values that were shared by a shared snapshot with a clone and that have been overwritten by new data values at the clone.

A third example of a deletion triggering event is that at least a predetermined number of data values that were shared by the shared snapshot with each clone (e.g., the second container) has been overwritten by new data values at the clone. Each time a new data value is written to each clone, it is checked whether the new data value has overwritten a data value that is stored at a corresponding logical offset of the shared snapshot. A counter can keep track of exactly how many data values of the shared snapshot have been overwritten by new data values at each clone, until a predetermined number of such data values has been overwritten, in which the shared snapshot is deemed to have been largely overwritten by the clone(s) and that the shared snapshot therefore no longer provides an efficient usage of storage space. FIG. 8, below, describes an example process of determining when this type of deletion triggering event has occurred.

A fourth example of a deletion triggering event is a user initiated shared snapshot deletion operation. For example, a user may manually identify that a particular shared snapshot that has only one dependent clone (or meets another criterion) should be deleted and input an operation to delete the shared snapshot via a user interface associated with the storage system that stores the shared snapshot.

In addition to the dependency of only one clone and the occurrence of a deletion triggering event, in some embodiments, a shared snapshot needs to meet one or more other requirements prior to being eligible for deletion. In some embodiments, one such requirement is that the first container associated with the shared snapshot that is determined to be deleted does not have a live index. For example, a container may not have a live index if the container has been deleted by a user (the snapshots of the deleted container may be retained for at least some time after the user initiated deletion of the container, in some embodiments). In some embodiments, a clone container that does not have a live index may store, if appropriate, data that links back to the shared snapshot of the source container from which the clone was generated. However, in some embodiments, a first container associated with the shared snapshot that is determined to be deleted may have a live index and the entries of the shared snapshot can be associated with the live index prior to deleting the shared snapshot. Moreover, in some embodiments, another such requirement is that the shared snapshot is not associated with an older snapshot (e.g., such that the clone does not need to be merged with the older snapshot of the shared snapshot after the shared snapshot has been deleted) and is also not associated with a younger snapshot (e.g., such that the shared snapshot does not need to be merged with the younger snapshot of the shared snapshot and/or the clone).

At 504, zero or more data values that are stored by the shared snapshot and shared with the second container are caused to be associated with the second container prior to deleting the shared snapshot. In various embodiments, those data values and/or mappings to data values, if any, that are shared by the shared snapshot with each clone (e.g., the second container) that are still needed (e.g., not yet overwritten) by the clone are identified. For example, if all the data values (or mappings to data values) that were shared by the shared snapshot with a particular clone have been overwritten at that clone, then no data values (or mappings to data values) from the shared snapshot are to be associated with that clone. However, if at least one data value (or a mapping to the at least one data value) that was shared by the shared snapshot with a particular clone has not been overwritten at that clone, then the at least data value (or mappings to the at least one data value) from the shared snapshot are to be associated with that clone. The identified data values and/or references/mappings (e.g., pointers) to the data values that have not been overwritten at a particular clone are copied into the live index, if one exists, of that clone (e.g., the second container) and also the oldest snapshot index of that clone (so that any snapshot of that clone that is younger than the oldest snapshot may also share the data values of the oldest snapshot). If there are no snapshots associated with that clone, then the identified data values and/or references/mappings to the data values are copied into the current snapshot index of that clone. After such identified data values and/or references/mappings to the data values of the shared snapshot are copied into one or more indices of the clone(s), the shared snapshot can be deleted or at least marked for deletion (e.g., and eventually deleted/reclaimed by a background garbage collection process).

After the shared snapshot is deleted, a clone (e.g., the second container) does not necessarily become independent (e.g., no longer dependent on any shared snapshots). In the event that the deleted shared snapshot was itself a clone that was generated on another shared snapshot, then a clone of the deleted shared snapshot would still depend from the other shared snapshot. In this scenario, in some embodiments, a link (e.g., a pointer) from the clone to the other shared snapshot is generated and/or a dependency relationship table, which stores dependent relationships between shared snapshots and their respective clone(s), would be updated to indicate that the other shared snapshot is the base for that clone.

Figure 6:
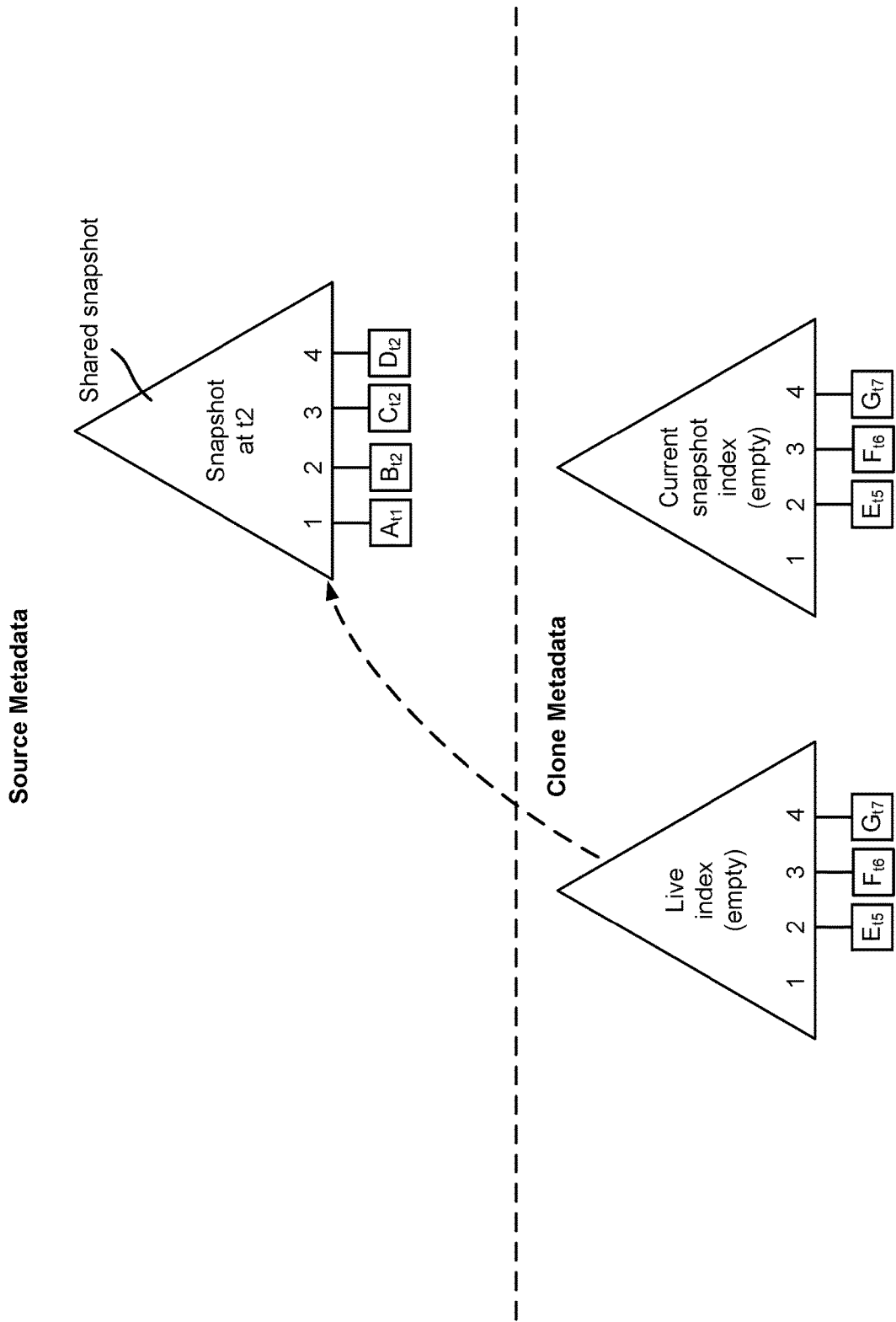
FIG. 6 is a diagram showing an example of a set of metadata associated with a source container and a set of metadata associated with a clone after several new data values have been written to the clone.

FIG. 6 is a diagram showing an example of a set of metadata associated with a source container and a set of metadata associated with a clone after several new data values have been written to the clone. In the example, a clone container was generated from the snapshot at time t2 of the source container. Since the creation of the clone container (e.g., the creation of an empty live index and an empty current snapshot index for the clone container), data value E was written to the logical offset 2 of the clone at time t5, data value F was written to the logical offset 3 of the clone at time t6, and data value G was written to the logical offset 4 of the clone at time t7, and thus such values are stored in the clone's live index and the clone's current snapshot index. Since the snapshot at time t2 had already stored (different) data values (B, C, and D) at respective logical offsets 2, 3, and 4, then the writes of E, F, and G at the clone effectively overwrite, for the clone, the data that was previously shared at logical offsets 2, 3, and 4 with the clone by the snapshot at time t2. As shown in the example of FIG. 6, over time, generally, more data values of the shared snapshot are overwritten by new writes at the clone, thereby decreasing the number of data values that are shared between the shared snapshot and the clone. As fewer data values are shared between a shared snapshot and its clone, the space efficiency that is provided by the shared snapshot diminishes. In some embodiments, the passage of time and the amount of new data values that are written to a clone are factors in determining whether to delete the shared snapshot.

FIG. 7 is a flow diagram showing an example of a determining an occurrence of a shared snapshot deletion event based on a number of data values that have been written to a clone of a shared snapshot. In some embodiments, process 700 is implemented at storage system 102 of FIG. 1.

Process 700 describes determining an occurrence of a shared snapshot deletion event based on a number of data values that have been written to one particular clone of a shared snapshot. If the shared snapshot has more than one dependent clone, then process 700 may repeated for each clone to determine whether the shared snapshot deletion event has occurred with respect to that particular clone. In some embodiments, in the event that the shared snapshot has more than one clone, a shared snapshot deletion event based on a number of data values that have been written to a clone is to occur for each clone before the shared snapshot can be deleted.

At 702, it is determined whether a new write to a clone container has occurred. In the event that a new write to a clone container has occurred, control is transferred to 704. Otherwise, in the event that a new write to a clone container has not occurred, control returns to 702 at a later time. The new write to the clone container includes one or more new data values to be written to the clone. The clone is generated from a shared snapshot of a source container.

At 704, a number of data values that have been written to the clone container is updated. The number of data values that have been written to the clone container is incremented by the number of new data values that the new write wrote to the clone container.

At 706, it is determined whether the number of data values that have been written to the clone container meets or exceeds a predetermined threshold. In the event that the number of data values that have been written to the clone container meets or exceeds a predetermined threshold, control is transferred to 708. Otherwise, in the event that the number of data values that have been written to the clone container does not meet or exceed a predetermined threshold, control returns to 702. If the number of data values that have been written to the clone container meets or exceeds a predetermined threshold, then a shared snapshot deletion triggering event has occurred and the shared snapshot is further checked for whether it has other dependent clones.

At 708, it is determined whether a shared snapshot from which the clone container depends has no other dependent clones. In the event that the shared snapshot from which the clone container depends has no other dependent clones, control is transferred to 710. Otherwise, in the event that the shared snapshot from which the clone container depends has at least one other dependent clone, control returns to 708 at a later time. For example, in the event that the shared snapshot from which the clone container depends has at least one other dependent clone, process 700 is performed for each of the other clones before the shared snapshot can be deemed to be eligible for deletion.

At 710, it is determined that the shared snapshot is eligible for deletion. In the event that a shared snapshot deletion triggering event has occurred and the shared snapshot has only one dependent clone, then the shared snapshot may be eligible for deletion. In some embodiments, it is also determined that the shared snapshot is eligible for deletion by verifying that the source container with which the shared snapshot is associated does not have a live index, the shared snapshot does not have a younger snapshot, and/or the shared snapshot does not have an older snapshot.

FIG. 8 is a flow diagram showing an example of a determining an occurrence of a shared snapshot deletion event based on a number of data values that were shared by a shared snapshot with a clone and that have been overwritten by new data values at the clone. In some embodiments, process 800 is implemented at storage system 102 of FIG. 1.

Process 800 describes determining an occurrence of a shared snapshot deletion event based on a number of data values that were shared by a shared snapshot with a clone and that have been overwritten by new data values at the clone. If the shared snapshot has more than one dependent clone, then process 800 may repeated for each clone to determine whether the shared snapshot deletion event has occurred with respect to that particular clone. In some embodiments, in the event that the shared snapshot has more than one clone, a shared snapshot deletion event based on a number of data values that that were shared by a shared snapshot with a clone and that have been overwritten by new data values at the clone is to occur for each clone before the shared snapshot can be deleted.

At 802, it is determined whether a new write to a clone container has occurred. In the event that a new write to a clone container has occurred, control is transferred to 804. Otherwise, in the event that a new write to a clone container has not occurred, control returns to 802 at a later time. The new write to the clone container includes one or more new data values to be written to the clone. The clone is generated from a shared snapshot of a source container.

At 804, it is determined whether a new data value that is associated with the new write overwrites an existing data value of a shared snapshot and that was shared with the clone container. If it has been determined that a new data value that is associated with the new write overwrites an existing data value of a shared snapshot and that was shared with the clone, control is passed to 806. Otherwise, if it has not been determined that a new data value that is associated with the new write overwrites an existing data value of a shared snapshot and that was shared with the clone, control is returned to 802. For example, a write of a new data value at a clone to a logical offset at which the shared snapshot had already stored a data value overwrites, for the clone, the data value previously shared by the shared snapshot.

At 806, a number of data values in the shared snapshot that have been overwritten is updated. The number of data values in the shared snapshot that have been overwritten is incremented by the number of new data values that the new write wrote to the clone container and that had overwritten data values previously shared by the shared snapshot.

At 808, it is determined whether the number of data values in the shared snapshot that have been overwritten meets or exceeds a predetermined threshold. In the event that the number of data values in the shared snapshot that have been overwritten meets or exceeds a predetermined threshold, control is transferred to 810. Otherwise, in the event that the number of data values in the shared snapshot that have been overwritten does not meet or exceed a predetermined threshold, control returns to 802. If the number of data values in the shared snapshot that have been overwritten meets or exceeds a predetermined threshold, then a shared snapshot deletion triggering event has occurred and the shared snapshot is further checked for whether it has other dependent clones.

At 810, it is determined whether a shared snapshot from which the clone container depends has no other dependent clones. In the event that the shared snapshot from which the clone container depends has no other dependent clones, control is transferred to 812. Otherwise, in the event that the shared snapshot from which the clone container depends has at least one other dependent clone, control returns to 810 at a later time. For example, in the event that the shared snapshot from which the clone container depends has at least one other dependent clone, process 800 is performed for each of the other clones before the shared snapshot can be deemed to be eligible for deletion.

At 812, it is determined that the shared snapshot is eligible for deletion. In the event that a shared snapshot deletion triggering event has occurred and the shared snapshot has only one dependent clone, then the shared snapshot may be eligible for deletion. In some embodiments, it is also determined that the shared snapshot is eligible for deletion by verifying that the source container with which the shared snapshot is associated does not have a live index, the shared snapshot does not have a younger snapshot, and/or the shared snapshot does not have an older snapshot.

Figure 9:
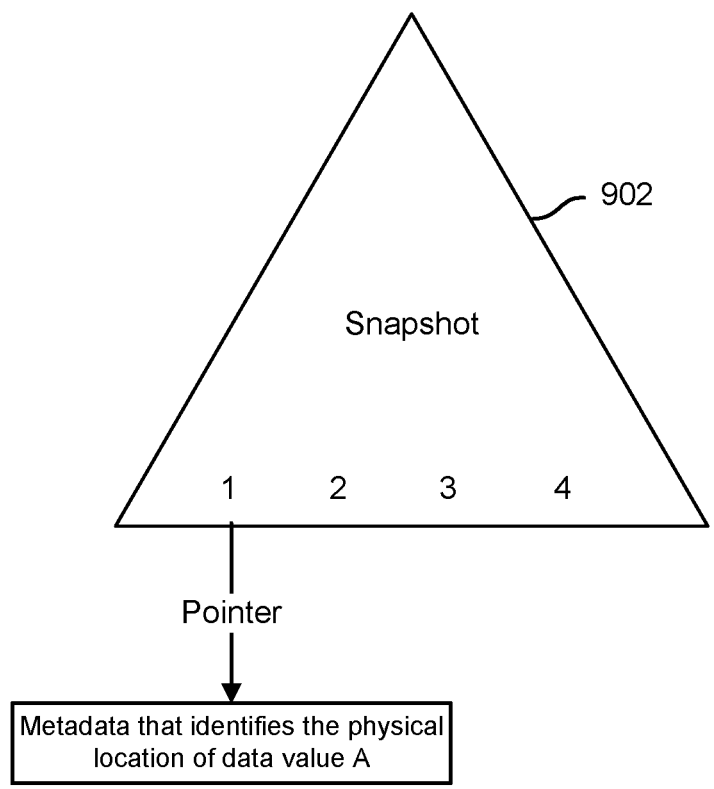
FIG. 9 is a diagram showing an example of a mapping that is stored by a snapshot index.

FIG. 9 is a diagram showing an example of a mapping that is stored by a snapshot index. In various embodiments, an index (e.g., a snapshot index, a live index, and/or a current snapshot index) in a set of metadata associated with a container stores, at a logical offset, a mapping to the location on a physical storage device of a data value. As shown in the example of FIG. 9, snapshot 902 stores a mapping at logical offset 1 that is a pointer (or another type of reference) to a piece of metadata that identifies the location on a physical storage device of data value A, which is associated with logical offset 1. For example, the piece of metadata identifies a disk identifier, a LBA (logical block address), and length on disk where data value A is stored. As such, when the data value associated with logical offset 1 of snapshot 902 is read, the pointer stored at logical offset 1 is used to locate the corresponding metadata, which is ultimately used to locate the physical storage location of data value A. By storing such lightweight mappings to data values in snapshot-related indices (instead of the actual data values themselves), the data values can easily be copied from a snapshot such as a shared snapshot and added to or otherwise associated with one or more indices of a clone. As mentioned above, prior to deleting a shared snapshot that is determined to be deleted, at least some mappings to the physical storage locations of data values that are stored by the shared snapshot are merged into one or more indices (e.g., the live index, the oldest snapshot index, and/or the current snapshot index) of the clone.

Figure 10:
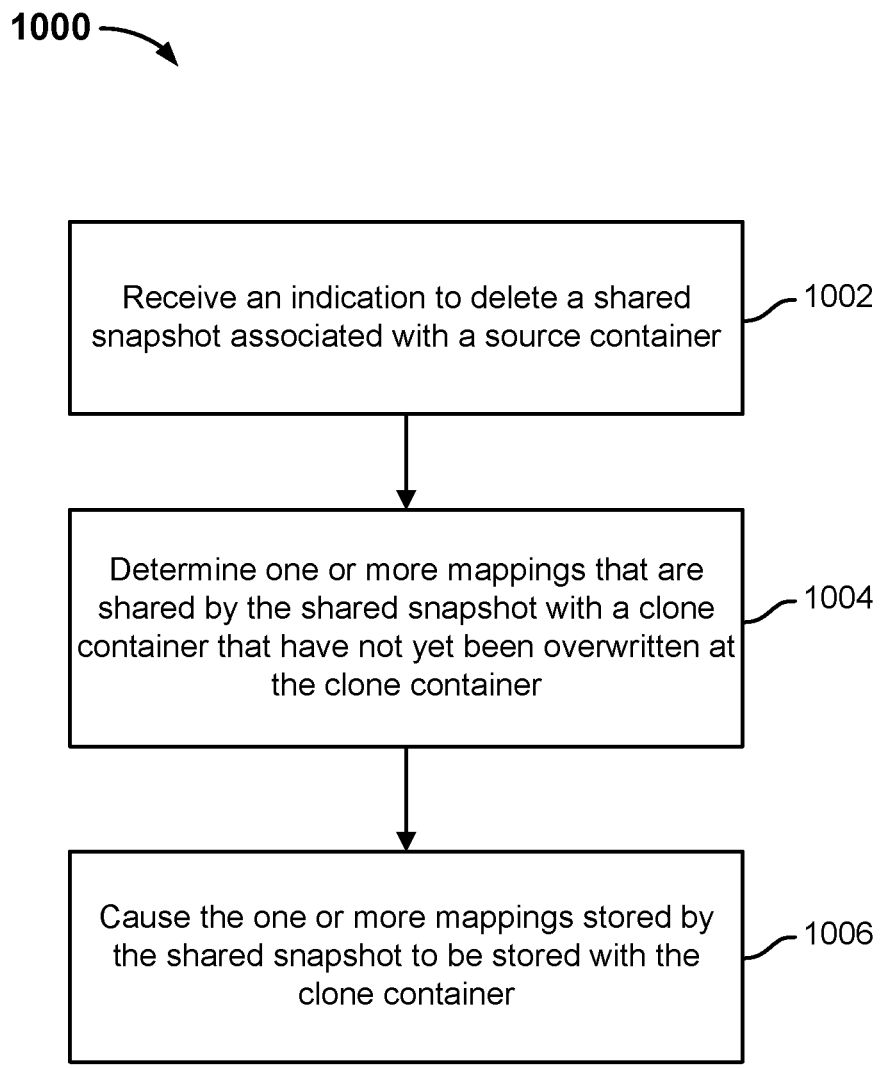
FIG. 10 is a flow diagram showing an embodiment of a process for merging mappings of a shared snapshot to be deleted into a clone of the shared snapshot.

FIG. 10 is a flow diagram showing an embodiment of a process for merging mappings of a shared snapshot to be deleted into a clone of the shared snapshot. In some embodiments, process 1000 is implemented at storage system 102 of FIG. 1. In some embodiments, step 504 of process 500 of FIG. 5 is implemented using process 1000.

Process 1000 describes merging mappings of a shared snapshot into one particular clone of the shared snapshot. If the shared snapshot has more than one dependent clone, then process 1000 may repeated for each clone that depends from the shared snapshot.

At 1002, an indication to delete a shared snapshot associated with a source container is received. The shared snapshot has already been identified to be eligible for deletion using a technique as described herein.

At 1004, one or more mappings that are shared by the shared snapshot with a clone container that have not yet been overwritten at the clone container are determined. Those mappings to data values that are stored in the shared snapshot that have not yet been overwritten by new mappings at the one clone of the shared snapshot are determined. For example, each mapping to a data value may be implemented using the example mapping that is described with FIG. 9.

At 1006, the one or more mappings stored by the shared snapshot are caused to be stored with the clone container. The determined mappings are copied from the shared snapshot index and stored at their respective logical offsets of one or more indices of the clone container. In various embodiments, the identified mappings to the data values are copied into the live index (if one exists) of the clone (the second container) and also the oldest snapshot index of the clone (so that any snapshot of the clone that is younger than the oldest snapshot may also share the data values of the oldest snapshot). If there are no snapshots associated with the clone, then the identified mappings to the data values are copied into the current snapshot index of the clone. After such identified mappings to the data values of the shared snapshot are copied into one or more indices of the clone, the shared snapshot can be deleted or at least marked for deletion (e.g., and eventually deleted/reclaimed by a background garbage collection process).

Figure 11:
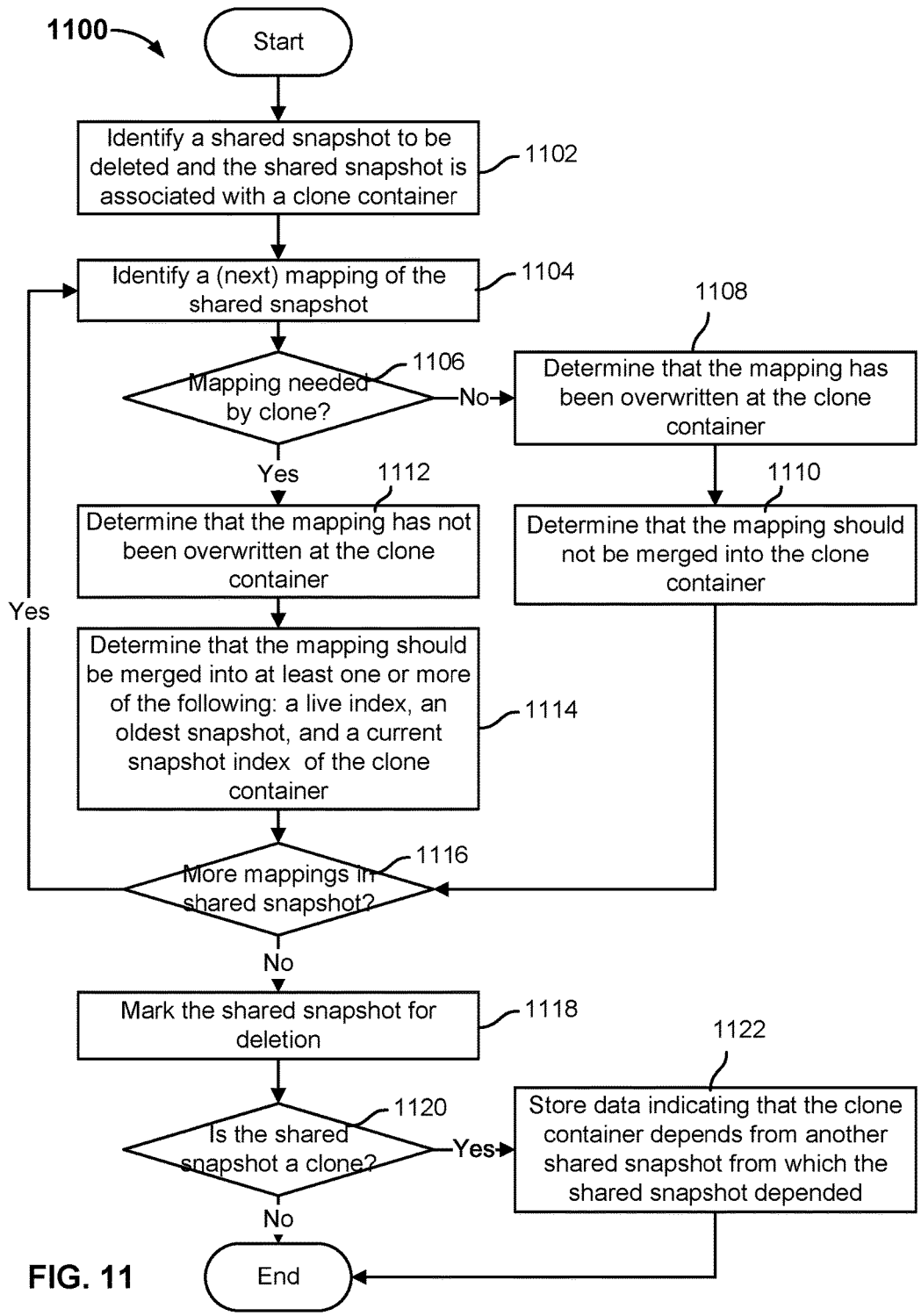
FIG. 11 is a flow diagram showing an example of a process for merging mappings of a shared snapshot to be deleted into a clone of the shared snapshot.

FIG. 11 is a flow diagram showing an example of a process for merging mappings of a shared snapshot to be deleted into a clone of the shared snapshot. In some embodiments, process 1100 is implemented at storage system 102 of FIG. 1. In some embodiments, step 504 of process 500 of FIG. 5 is implemented using process 1100. In some embodiments, process 1000 of FIG. 10 is implemented using process 1100.

Process 1100 describes an example process of checking each mapping that is stored in the shared snapshot for whether that mapping is still needed by a particular clone container and therefore should be merged into the clone prior to deleting the shared snapshot. For example, each mapping to a data value may be implemented using the example mapping that is described with FIG. 9. If the shared snapshot has more than one dependent clone, then process 1100 may repeated for each clone that depends from the shared snapshot.

At 1102, a shared snapshot is identified to be deleted and the shared snapshot is associated with a clone container. The shared snapshot has already been identified to be eligible for deletion using a technique described herein.

At 1104, a (next) mapping of the shared snapshot is identified. The mapping that is stored at the next logical offset of the shared snapshot is identified. For example, a mapping stored at the logical offset of the shared snapshot points to a piece of metadata that identifies a location on a physical storage device at which the data value associated with the logical offset is stored.

At 1106, it is determined whether the mapping is needed by the clone container. In the event that the mapping is determined to be needed by the clone container, control is transferred to 1112. Otherwise, in the event that the mapping is determined to not be needed by the clone container, control is transferred to 1108. The mapping of the shared snapshot is still needed by the clone if the clone container (e.g., a snapshot of the clone, a live index of the clone, and/or a current snapshot index of the clone) does not store a mapping at the same logical offset. This is because a read to that logical offset associated with the clone would not be able to locate a mapping stored at that logical offset at the clone and as such, the search for a mapping at that logical offset would continue at the shared snapshot. The mapping of the shared snapshot would no longer be needed by the clone if the clone container (e.g., a snapshot of the clone, a live index of the clone, and/or a current snapshot index of the clone) stores a mapping at the same logical offset. This is because a read to that logical offset associated with the clone would access the mapping stored at the logical offset of the clone rather than continuing to search for the mapping stored at the logical offset of the shared snapshot.

At 1108, it is determined that the mapping has been overwritten at the clone container. If the clone stores a mapping at the logical offset for which the shared snapshot had stored the mapping, then the mapping in the shared snapshot is considered to be overwritten.

At 1110, it is determined that the mapping should not be merged into the clone container. A mapping of the shared snapshot that is overwritten is no longer needed by the clone and does not need to be merged into the clone and can also be deleted from the shared snapshot.

At 1112, it is determined that the mapping has not been overwritten at the clone container. If the clone does not store a mapping at the logical offset for which the shared snapshot had stored the mapping, then the mapping in the shared snapshot is considered to not be overwritten.

At 1114, it is determined that the mapping should be merged into at least one or more of the following: a live index, an oldest snapshot of the clone container, and a current snapshot index of the clone container. A mapping of the shared snapshot that is not overwritten is still needed by the clone and therefore needs to be merged into at least one index of the clone. In various embodiments, the mapping is copied into the live index, if one exists, of the clone and also the oldest snapshot index of the clone (so that any snapshot of the clone that is younger than the oldest snapshot may also share the data values of the oldest snapshot). If there are no snapshots associated with the clone, then the identified mapping is copied into the current snapshot index of the clone.

At 1116, it is determined whether there is at least one more mapping in the shared snapshot. In the event that it is determined that there is at least one more mapping in the shared snapshot, control is returned to 1104. Otherwise, in the event that it is determined that there are no more mappings in the shared snapshot, control is transferred to 1118.

At 1118, the shared snapshot is marked for deletion. After the mapping of the shared snapshot is copied into one or more indices of the clone, the shared snapshot can be deleted or at least marked for deletion (e.g., and eventually deleted/reclaimed by a background garbage collection process).

At 1120, it is determined whether the shared snapshot is a clone. In the event that it is determined that the shared snapshot is itself a clone and therefore depends from another shared snapshot, control is returned to 1122. Otherwise, in the event it is determined that the shared snapshot is not itself a clone and therefore does not depend from another shared snapshot, optionally, a data that indicates that the clone container is now a non-clone container going forward is stored and process 1100 ends.

At 1122, data indicating that the clone container depends from another shared snapshot from which the shared snapshot depended is stored. If the shared snapshot that is marked for deletion is itself part of a clone that depends from another shared snapshot, then the clone of the shared snapshot that is marked for deletion does not become independent as a result of the deletion of the shared snapshot. After the shared snapshot is marked for deletion, a link (e.g., a pointer or other reference) from the clone to the other shared snapshot, from which the shared snapshot that is marked for deletion depended, is stored. In some embodiments, after the shared snapshot is marked for deletion, data is stored in a data structure (e.g., a dependency relationship table, which is described in further detail with FIGS. 13 and 14, below) and is updated to indicate that the other shared snapshot has the clone directly depending from it.

Figure 12A:
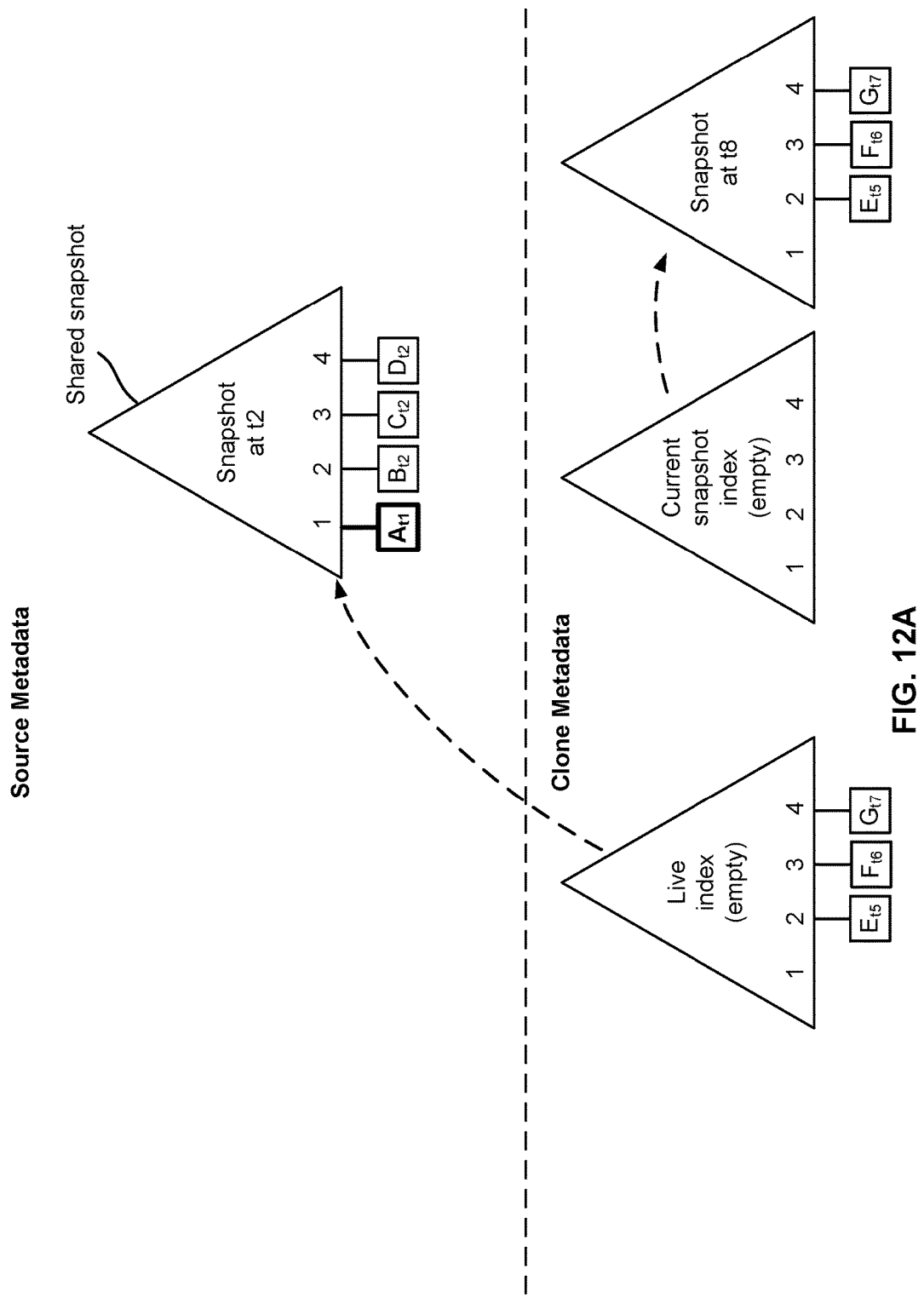
FIG. 12A is a diagram that shows determining a mapping of a shared snapshot, that is to be deleted, that is still needed by a particular clone container of its dependent clone(s).
Figure 12B:
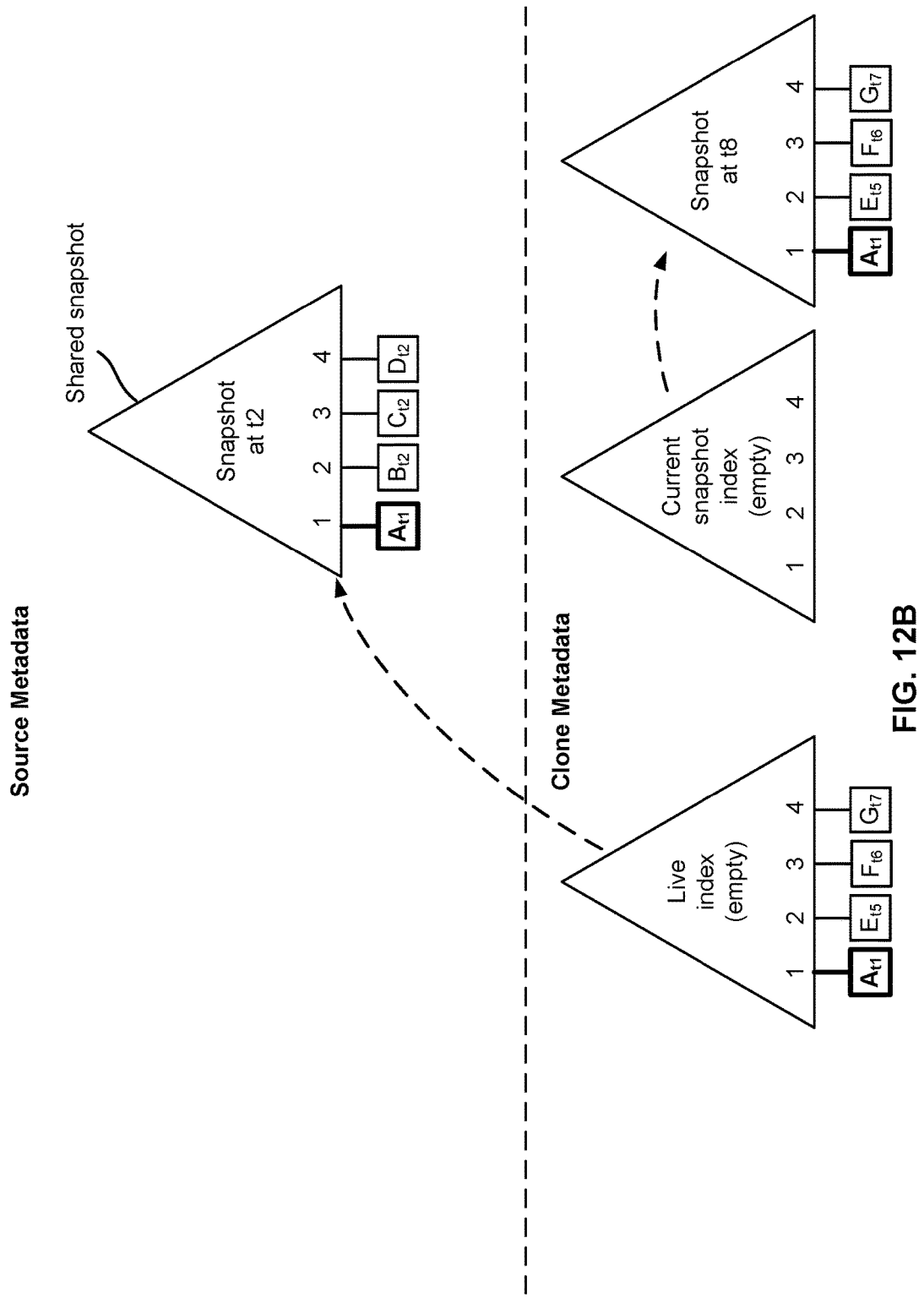
FIG. 12B is a diagram that shows a determined mapping of a shared snapshot that has been merged into a particular clone container of its dependent clone(s).

FIGS. 12A and 12B describe an example of merging a mapping of a shared snapshot associated with a source container into a particular clone container and wherein the shared snapshot is determined to be deleted.

FIG. 12A is a diagram that shows determining a mapping of a shared snapshot, that is to be deleted, that is still needed by one of its dependent clones. For example, each mapping to a data value may be implemented using the example mapping that is described with FIG. 9. In the example, a clone container was generated from the snapshot at time t2 of the source container. Since the creation of the clone container (e.g., the creation of an empty live index and an empty current snapshot index for the clone container), a mapping to data value E was written to logical offset 2 of the clone at time t5, a mapping to data value F was written to logical offset 3 of the clone at time t6, and a mapping to data value G was written to logical offset 4 of the clone at time t7, and thus such values are stored in the clone's live index and the clone's current snapshot index. At later time t8, a snapshot creation event had occurred and so the snapshot at time t8 was created based on the contents that were included, at time t8, in the clone's current snapshot index, which included a mapping to data value E at logical offset 2, a mapping to data value F at logical offset 3, and a mapping to data value G at logical offset 4 of the clone. Because the snapshot at time t2 had already stored mappings to data values (B, C, and D) at respective logical offsets 2, 3, and 4, then the writes mappings to data values E, F, and G at the clone effectively overwrite, for the clone, the mappings that were previously shared at logical offsets 2, 3, and 4 with the clone by the snapshot at time t2. However, using a process such as process 1000 of FIG. 10 or process 1100 of FIG. 11, it can be determined that the mapping to data value A stored at logical offset 1 of the snapshot at time t2 is not overwritten at the clone and it is determined to be merged into the clone prior to deleting the snapshot at time t2. FIG. 12B is a diagram that shows a determined mapping of a shared snapshot that has been merged into its dependent clone. Continuing the example of FIG. 12A, in FIG. 12B, the determined mapping to data value A stored at logical offset 1 of the shared snapshot, the snapshot at time t2, is copied to the same logical offset of the live index and the oldest snapshot index, the snapshot at time t8, of the clone. Assuming that the relevant mappings from the shared snapshot have been merged into each of its dependent clones, then the shared snapshot, the snapshot at time t2, can be marked for deletion.

Figure 13:
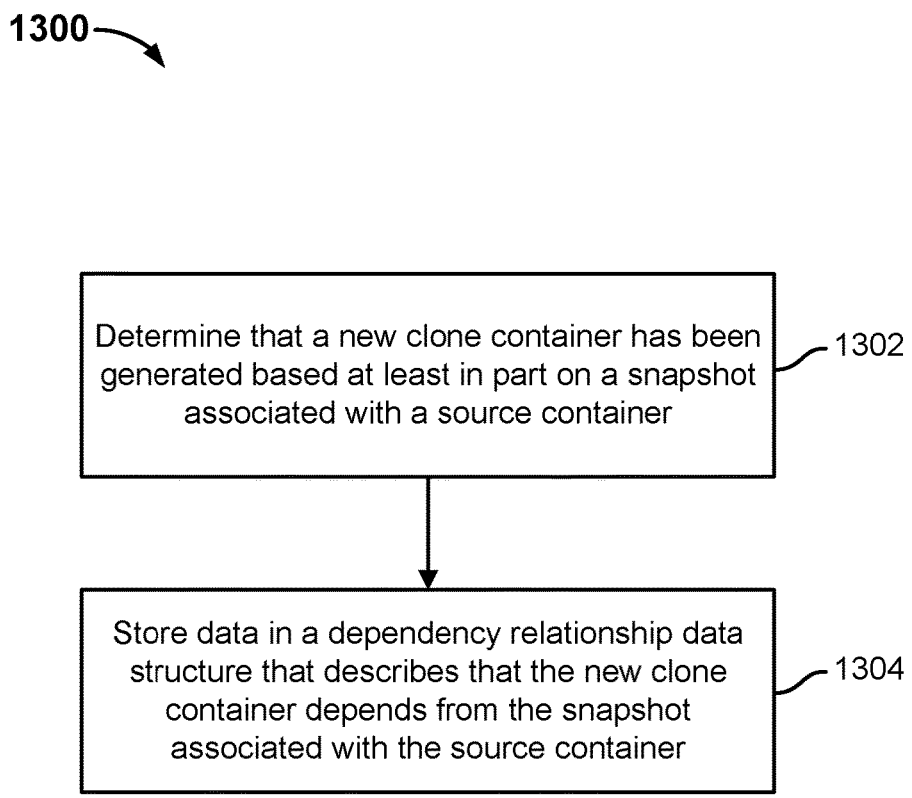
FIG. 13 is a flow diagram showing an example of a process for updating a dependency relationship data.

FIG. 13 is a flow diagram showing an example of a process for updating a dependency relationship data. In some embodiments, process 1300 is implemented at storage system 102 of FIG. 1.

At 1302, a new clone container that has been generated based at least in part on a snapshot associated with a source container is determined. In some embodiments, a new clone container is generated based on a snapshot of a source container. The snapshot becomes a shared snapshot as a result of the cloning procedure. In some embodiments, the new clone is generated by creating an empty live index and an empty current snapshot index for the new clone. Furthermore, in some embodiments, a link from the live index of the clone to the shared snapshot is also generated (to use to service reads that cannot be serviced by the live index or other index of the clone).

At 1304, data in a dependency relationship data structure that describes that the new clone container depends from the snapshot associated with the source container is stored. As a result of the cloning procedure, the relationship of the shared snapshot having a dependent clone is stored in a dependency relationship data structure (e.g., a dependent relationship table). In various embodiments, a dependency relationship data structure stores shared snapshot-to-immediate clone relationships. As such, the dependency relationship data structure may be traversed to identify the chain of multiple shared snapshot-to-immediate clone relationships.

FIG. 14 is an example of a dependency relationship data structure. Dependency relationship data structure 1400 stores several shared snapshot-to-immediate clone container relationships. In the example, the left column identifies a shared snapshot (of a source container), the center column identifies a clone container (e.g., a file, a VM, or a vdisk) that was generated based on the shared snapshot of the same row, and the right column identifies snapshots of the clone container (if there are any) of the same row. As such, dependency relationship data structure 1400 indicates that shared snapshot SS0, which is associated with File 0 (not shown in the diagram), has clone File 1 and File 1 has snapshot SS1. Snapshot SS1 of clone File 1 is in turn a shared snapshot for clone File 2 and File 2 has SS2. Snapshot SS2 of clone File 2 is in turn a shared snapshot for clone File 3 and File 3 has SS3. Snapshot SS3 of clone File 3 is in turn a shared snapshot for clones File 4, File, 5, and File 6. File 4 has snapshot SS4, File 5 has snapshot SS5, and File 6 has no snapshots. As mentioned above, each clone is a new container that is separate from the source container associated with the shared snapshot from which the clone was generated.

In the event that a shared snapshot is deleted or marked for deletion based on the techniques described herein, in some embodiments, the dependency relationship data structure can be updated to remove the presence of the deleted shared snapshot. For example, if shared snapshot SS2 of File 2 is deleted, then entries of the dependency relationship data structure that include snapshot SS2 are revised. In the example of dependency relationship data structure 1400, the entry that describes that shared snapshot SS1 has clone File 2 with snapshot SS2 and the entry that describes that shared snapshot SS2 has clone File 3 with snapshot SS3 may be deleted and replaced with a new entry that describes that shared snapshot SS1 has clone File 3 with snapshot SS3.

A dependency relationship data structure can be traversed to find each of one or more clones that depend from each shared snapshot and also which clones actually themselves contain shared snapshots. A series of shared snapshot-to-immediate clone relationships is shown in FIG. 15, below.

Figure 15:
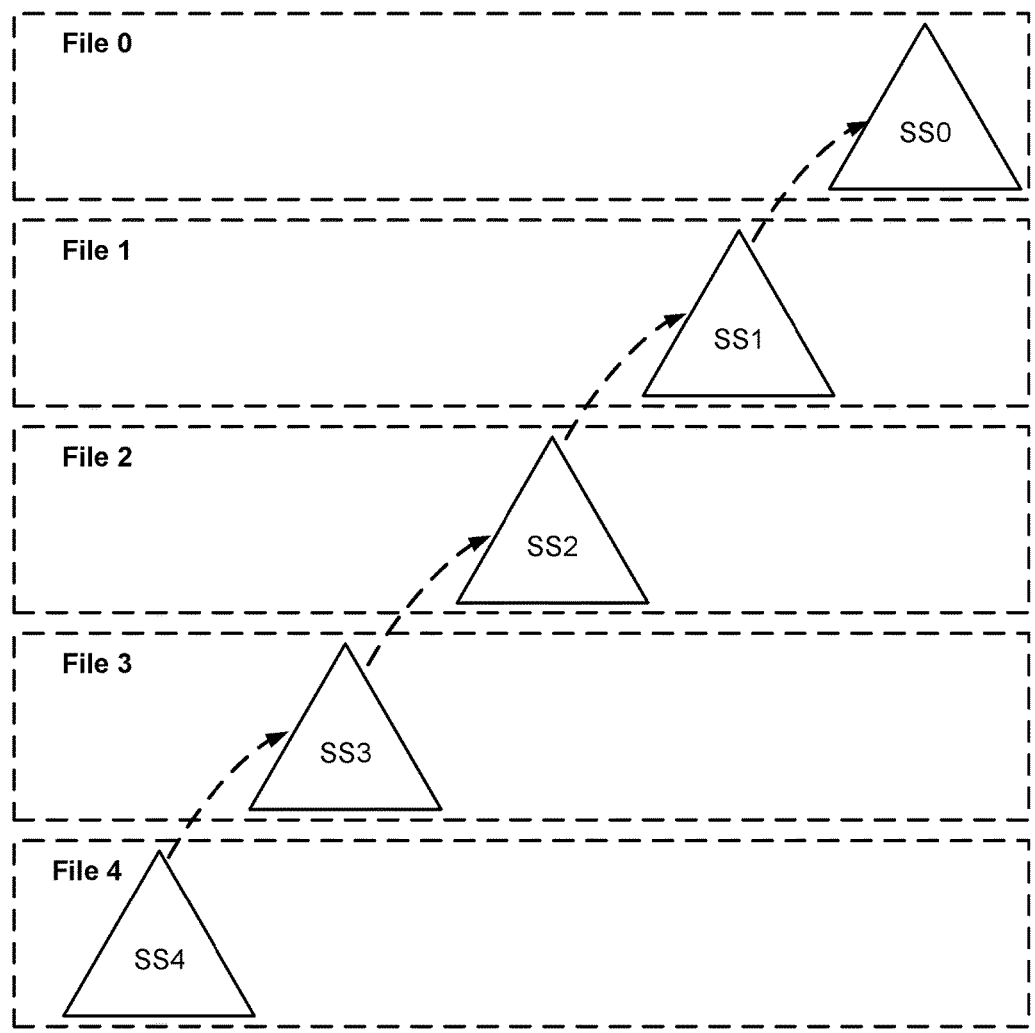
FIG. 15 is a diagram showing a series of shared snapshot-to-immediate clone relationships.

FIG. 15 is a diagram showing a series of shared snapshot-to-immediate clone relationships. In the example, each snapshot is associated with a container that is a file. As mentioned before, each shared snapshot and its immediate clone are different files. The shared snapshot-to-immediate clone relationships of dependency relationship data structure 1400 (with the exception of clones File 5 and File 6, which are not shown for simplicity) of FIG. 14 are depicted in FIG. 15. As shown in FIG. 15, shared snapshot SS0 is associated with File 0 (not shown in dependency relationship data structure 1400) and has clone File 1 with snapshot SS1. Snapshot SS1 of File 1 has clone File 2 with snapshot SS2. Snapshot SS2 of File 2 has clone File 3 with snapshot SS3. Snapshot SS3 of File 3 has clone File 4 with snapshot SS4. Although not shown in FIG. 15, each clone may include a live index and/or a current snapshot index.

The series of shared snapshot-to-immediate clone relationships shows that some shared snapshots are intermediate shared snapshots such that even if they are deleted, their immediate clones will not become independent. Once an intermediate shared snapshot is deleted, the clone of the deleted shared snapshot simply becomes directly dependent upon the shared snapshot from which the deleted shared snapshot had depended. For example, shared snapshot SS1 has clone File 2. However, because shared snapshot SS1 is part of File 1, which is a clone of shared snapshot SS0 of File 0, even after shared snapshot SS1 is deleted, File 2 would still depend from shared snapshot SS0 of File 0.

In various embodiments, multiple snapshot deletion operations (including deletion of shared snapshots or snapshots that do not have dependent clones) may be received (e.g., via user interface and/or based on an automatic snapshot deletion determination) and at least some of them may be processed at least partially concurrently, while some others are to be performed serially. In some embodiments, two snapshot deletion operations that can be deleted at least partially concurrently are stored in different processing queues whereas two snapshot deletion operations that cannot be deleted at least partially concurrently are stored in the same processing queue. Operations in the same processing queue must be performed serially whereas operations in different processing queues may be performed at least partially concurrently (e.g., by two different threads and/or processors). In some embodiments, the deletion of two snapshots, both in different chains of snapshots that are associated with two different containers can be processed at least partially concurrently. For example, deleting a snapshot in a chain of snapshots associated with one container involves either merging the mappings of the snapshot into an immediately older or an immediately younger snapshot. However, the deletion of two snapshots, both in the same chain of snapshots that is associated with one container, may be processed at least partially concurrently if the two snapshots are not immediate neighbors within the same chain. Furthermore, in some embodiments, the deletion of two shared snapshots across different containers may be processed at least partially concurrently if the two shared snapshots are not immediate neighbors (i.e., one of such shared snapshots cannot be part of a clone of the other such shared snapshot). For example, snapshot SS3 and snapshot SS2 may not be concurrently deleted. This is because to delete one of the snapshots, its content must be first merged into a neighboring snapshot (e.g., a clone) before it can be deleted so the simultaneous deletion of two neighboring snapshots (e.g., a shared snapshot and its immediate clone) would result in a loss of data and/or burdensome computations.

Figure 16:
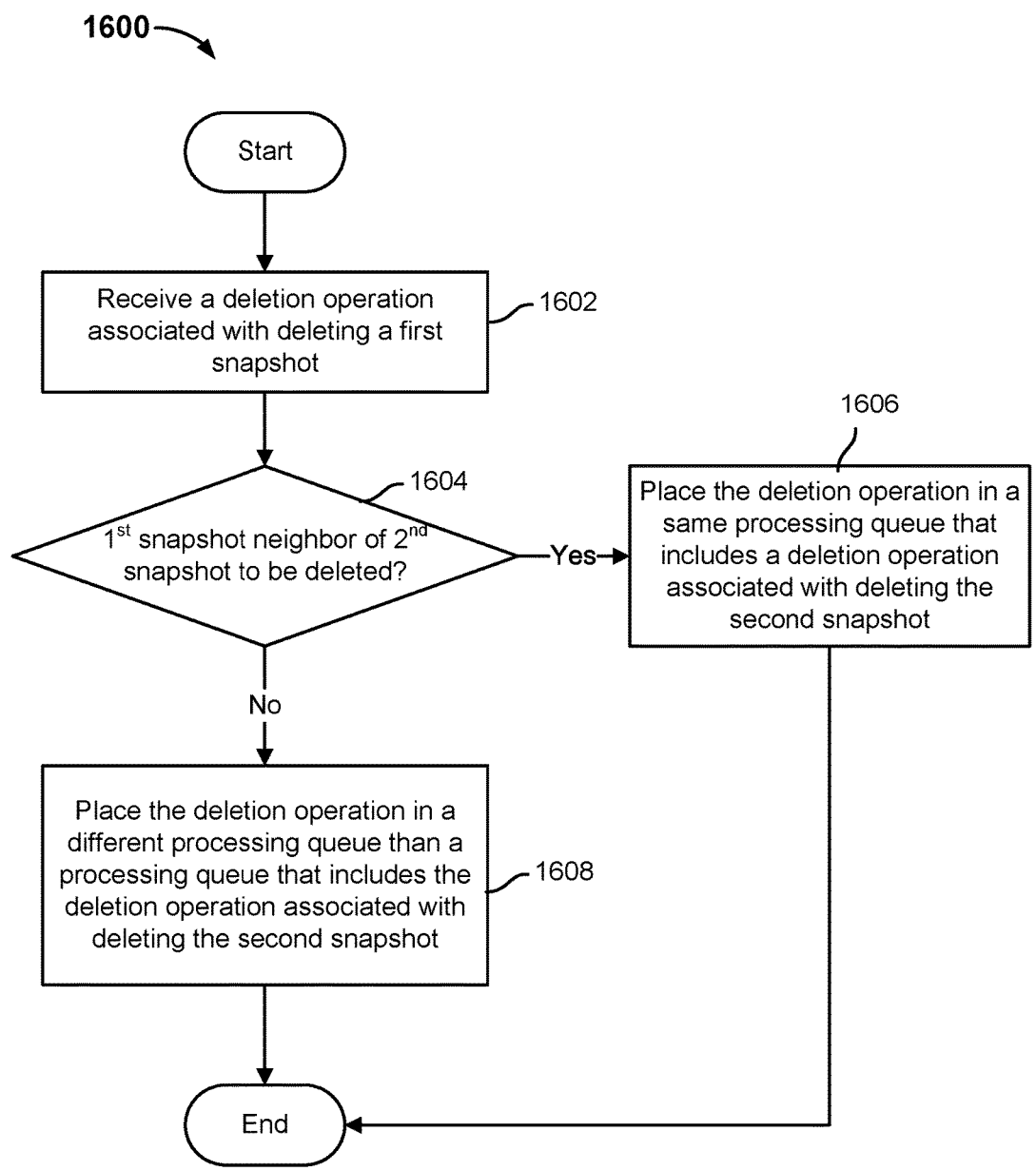
FIG. 16 is a flow diagram showing an example of a process for placing snapshot deletion operations in processing queues.

FIG. 16 is a flow diagram showing an example of a process for placing snapshot deletion operations in processing queues. In some embodiments, process 1600 is implemented at storage system 102 of FIG. 1.

At 1602, a deletion operation associated with deleting a first snapshot is received. For example, the snapshot comprises a shared snapshot (one from which at least one clone is dependent) or the snapshot comprises a non-shared snapshot (one from no clones are dependent). The shared snapshot may be determined to be deleted based on the techniques described herein.

At 1604, it is determined whether the first snapshot comprises a neighbor of a second snapshot to be deleted. In the event that the first snapshot comprises a neighbor of a snapshot to be deleted, control is transferred to 1606. Otherwise, in the event that the first snapshot is not a neighbor of a second snapshot to be deleted, control is transferred to 1608.

If the first snapshot comprises a neighboring snapshot relative to the second container within the same chain of snapshots associated with the same container or if the first snapshot comprises a neighboring snapshot relative to the second container across two containers (one of which is a clone of the other), then the two snapshots may not be deleted at least partially concurrently and should therefore be deleted serially. For example, snapshot SS0 and snapshot SS1 of FIG. 15 are immediate neighbors across two different containers (e.g., files, one of which is a clone of the other) and therefore could not be deleted concurrently.

At 1606, the deletion operation is placed in a same processing queue that includes a deletion operation associated with deleting the second snapshot. If the two snapshots may not be deleted at least partially concurrently, then the two snapshot deletion operations are stored in the same processing queue so that they can be performed serially.

At 1608, the deletion operation is placed in a different processing queue than a processing that includes the deletion operation associated with deleting the second snapshot. If the two snapshots may be deleted at least partially concurrently, then the two snapshot deletion operations are stored in different processing queues so that they can be performed at least partially concurrently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    determine to delete a shared snapshot associated with a first container, wherein the shared snapshot shares with a second container at least a subset of data values that are stored by the shared snapshot, the determination is based at least in part on the shared snapshot sharing data values with not more than a prescribed number of containers other than the second container and an occurrence of a deletion triggering event;
determine at least one data value that is stored by the shared snapshot and shared with the second container but that is not overwritten by a new data value at the second container; and
cause the at least one data value to be associated with the second container prior to deleting the shared snapshot; and
a storage device coupled to the processor and configured to store the shared snapshot.

2. The system of claim 1, wherein the prescribed number of containers other than the second container is zero.

3. The system of claim 1, wherein the second container comprises a clone that is generated from the shared snapshot.

4. The system of claim 1, wherein the second container is associated with zero or more snapshots.

5. The system of claim 1, wherein the second container is associated with zero or more snapshots and no live index.

6. The system of claim 1, wherein the deletion triggering event comprises a user initiated operation to delete the shared snapshot.

7. The system of claim 1, wherein the deletion triggering event comprises an elapse of an expiration time associated with the shared snapshot.

8. The system of claim 1, wherein the deletion triggering event comprises a predetermined number of data values having been written to the second container.

9. The system of claim 1, wherein the deletion triggering event comprises a predetermined number of data values that are shared by the shared snapshot and overwritten at the second container.

10. The system of claim 1, wherein the at least one data value that is stored by the shared snapshot and shared with the second container but that is not overwritten by the new data value at the second container comprises a mapping to the at least one data value and wherein to cause the mapping to at least one data value that is stored by the shared snapshot to be associated with the second container prior to deleting the shared snapshot comprises to copy the mapping to the at least one data value into the second container.

11. The system of claim 10, wherein to copy the mapping to the new data value into the second container comprises to copy the mapping to the new data value into an oldest snapshot associated with the second container.

12. The system of claim 10, wherein to copy the mapping to the new data value into the second container comprises to:
determine that the second container is not associated with a snapshot; and
in response to the determination that the second container is not associated with the snapshot, copy the mapping to the new data value into a current snapshot index associated with the second container.

13. The system of claim 1, wherein the processor is further configured to:
mark the shared snapshot for deletion;
determine whether the shared snapshot depended from another shared snapshot; and
wherein in the event that the shared snapshot depended from the other shared snapshot, update a dependency relationship data structure to indicate that the second container depends from the other shared snapshot.

14. The system of claim 1, wherein the processor is further configured to:
mark the shared snapshot for deletion;
determine whether the shared snapshot depended from another shared snapshot; and
wherein in the event that the shared snapshot does not depend from another shared snapshot, store data indicating that the second container is a non-clone container.

15. The system of claim 1, wherein a dependency relationship data structure stores data that indicates that the second container depends from the shared snapshot.

16. The system of claim 1, wherein the shared snapshot comprises a first snapshot and wherein the processor is further configured to:
receive a deletion operation associated with deleting a second snapshot;
determine whether the second snapshot comprises a neighbor to the first snapshot; and
wherein in the event that the second snapshot comprises the neighbor to the first snapshot, place the deletion operation associated with the deleting of the second snapshot in a same processing queue that includes a deletion operation associated with deleting the first snapshot; and
wherein in the event that the second snapshot does not comprise the neighbor to the first snapshot, place the deletion operation associated with the deleting of the second snapshot in a different processing queue than a processing queue that includes a deletion operation associated with deleting the first snapshot.

17. A method, comprising:
determining to delete a shared snapshot associated with a first container, wherein the shared snapshot shares with a second container at least a subset of data values that are stored by the shared snapshot, the determination based at least in part on the shared snapshot sharing data values with not more than a prescribed number of containers other than the second container and an occurrence of a deletion triggering event;
determining at least one data value that is stored by the shared snapshot and shared with the second container but that is not overwritten by a new data value at the second container; and
causing the at least one data value to be associated with the second container prior to deleting the shared snapshot.

18. The method of claim 17, wherein the deletion triggering event comprises a user initiated operation to delete the shared snapshot.

19. The method of claim 17, wherein the deletion triggering event comprises an elapse of an expiration time associated with the shared snapshot.

20. The method of claim 17, wherein the deletion triggering event comprises a predetermined number of data values having been written to the second container.

21. The method of claim 17, wherein the deletion triggering event comprises a predetermined number of data values that are shared by the shared snapshot and overwritten at the second container.

22. The method of claim 17, wherein the at least one data value that is stored by the shared snapshot and shared with the second container but that is not overwritten by the new data value at the second container comprises a mapping to the at least one data value and wherein to cause the mapping to the at least one data value that is stored by the shared snapshot to be associated with the second container prior to deleting the shared snapshot comprises to copy the mapping to the at least one data value into the second container.

23. A computer program product, the computer program product being embodied in a non-transitory computer readable storage medium and comprising computer instructions for:
- determining to delete a shared snapshot associated with a first container, wherein the shared snapshot shares with a second container at least a subset of data values that are stored by the shared snapshot, the determination is based at least in part on the shared snapshot sharing data values with not more than a prescribed number of containers other than the second container and an occurrence of a deletion triggering event;
- determining at least one data value that is stored by the shared snapshot and shared with the second container but that is not overwritten by a new data value at the second container; and
- causing the at least one data value to be associated with the second container prior to deleting the shared snapshot.

* * * * *